(12) United States Patent
Moffet et al.

(10) Patent No.: US 12,020,052 B2
(45) Date of Patent: Jun. 25, 2024

(54) GOAL-DIRECTED SOFTWARE-DEFINED NUMA WORKING SET MANAGEMENT

(71) Applicant: Hewlett PAckard Enterprise Development LP, Spring, TX (US)

(72) Inventors: Brian D. Moffet, Santa Cruz, CA (US); John Houston Gray, Scotts Valley, CA (US); Jeffrey Paul Radick, Campbell, CA (US); Charles Joseph Levine, Clyde Hill, WA (US); Isaac R. Nassi, Los Gatos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 832 days.

(21) Appl. No.: 17/081,529

(22) Filed: Oct. 27, 2020

(65) Prior Publication Data

US 2021/0132979 A1 May 6, 2021

Related U.S. Application Data

(60) Provisional application No. 62/928,215, filed on Oct. 30, 2019.

(51) Int. Cl.
*G06F 9/455* (2018.01)
*G06F 9/50* (2006.01)
*G06Q 10/0631* (2023.01)

(52) U.S. Cl.
CPC ........ *G06F 9/45558* (2013.01); *G06F 9/5077* (2013.01); *G06F 2009/4557* (2013.01); *G06Q 10/06315* (2013.01)

(58) Field of Classification Search
CPC ............... G06F 9/45558; G06F 9/5077; G06F 2009/4557; G06Q 10/06315
See application file for complete search history.

(56) References Cited

U.S. PATENT DOCUMENTS

2009/0288087 A1    11/2009    Ringseth
2010/0251234 A1*    9/2010    Oshins ................. G06F 9/4856
                                                                                                                                                        718/1

(Continued)

OTHER PUBLICATIONS

International Search Report and Written Opinion received for PCT Patent Application No. PCT/US20/057507, dated Feb. 5, 2021, 9 pages.

(Continued)

*Primary Examiner* — Jacob D Dascomb
(74) *Attorney, Agent, or Firm* — Slater Matsil, LLP

(57) ABSTRACT

Initializing a software-defined server having software-defined NUMA domains includes, when booting a virtual environment defined by a set of hyper-kernels running on a plurality of physically interconnected computing nodes, accessing information associated with a software-defined NUMA domain configuration. It further includes, based at least in part on the accessed information, assigning software-defined NUMA domains to computing nodes. It further includes assigning virtualized resources to the software-defined NUMA domains.
Handling a stalling event involving software-defined NUMA domains includes receiving an indication that a core or hyperthread which instantiates a virtual processor cannot access a virtualized resource needed by the core or hyperthread. It further includes determining, based at least in part on at least one of (1) a software-defined NUMA (Non Uniform Memory Access) domain to which the needed virtualized resource is assigned, (2) a software-defined NUMA domain to which the virtual processor is assigned, or (3) a software-defined NUMA domain associated with a computing node that has the core or hyperthread, whether to perform at least one of migrating the virtual processor or migrating the needed virtualized resource.

10 Claims, 17 Drawing Sheets

(56) References Cited

U.S. PATENT DOCUMENTS

| | | |
|---|---|---|
| 2012/0079232 A1 | 3/2012 | Hinton |
| 2012/0174097 A1 | 7/2012 | Levin |
| 2014/0245295 A1* | 8/2014 | Tsirkin .................. G06F 9/5077 |
| | | 718/1 |
| 2017/0031819 A1 | 2/2017 | Venkatasubramanian |
| 2017/0068562 A1 | 3/2017 | Oshins |
| 2017/0149921 A1* | 5/2017 | Nassi .................. H04L 67/2885 |
| 2019/0146803 A1 | 5/2019 | Reed |

OTHER PUBLICATIONS

Ali et al. Performance Evaluation of HPC Benchmarks on VMware's ESXi Server. https://dl.acm.org/citation.cfm?id=2238356.2238384. Bordeaux, France—Aug. 29-Sep. 2, 2011—p. 213.

Chapman et al. vNUMA: A Virtual Shared-Memory Multiprocessor: https://www.usenix.org/conference/usenix-09/presentation/vnuma-virtual-shared-memory-multiprocessor. Jun. 17, 2009.

Josh Simons. vNUMA: What it is and why it matters: https://octo.vmware.com/vnuma-what-it-is-and-why-it-matters/. Sep. 19, 2011.

* cited by examiner

GOAL-DIRECTED SOFTWARE-DEFINED NUMA WORKING SET MANAGEMENT

CROSS REFERENCE TO OTHER APPLICATIONS

This application claims priority to U.S. Provisional Patent Application No. 62/928,215 entitled GOAL-DIRECTED VIRTUAL NUMA WORKING SET MANAGEMENT filed Oct. 30, 2019 which is incorporated herein by reference for all purposes.

BACKGROUND OF THE INVENTION

In existing computing systems, one challenge for users such as Information Technology (IT) administrators and Database Administrators (DBAs) is that they are often unable to change their hardware. Once they buy the hardware, they are often committed to it for several years (e.g., three years or five years). However, the needs and requirements of the applications that such users are running on such hardware may change over time, resulting in less than desirable performance.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Software-Defined Server Overview

Figure 1:
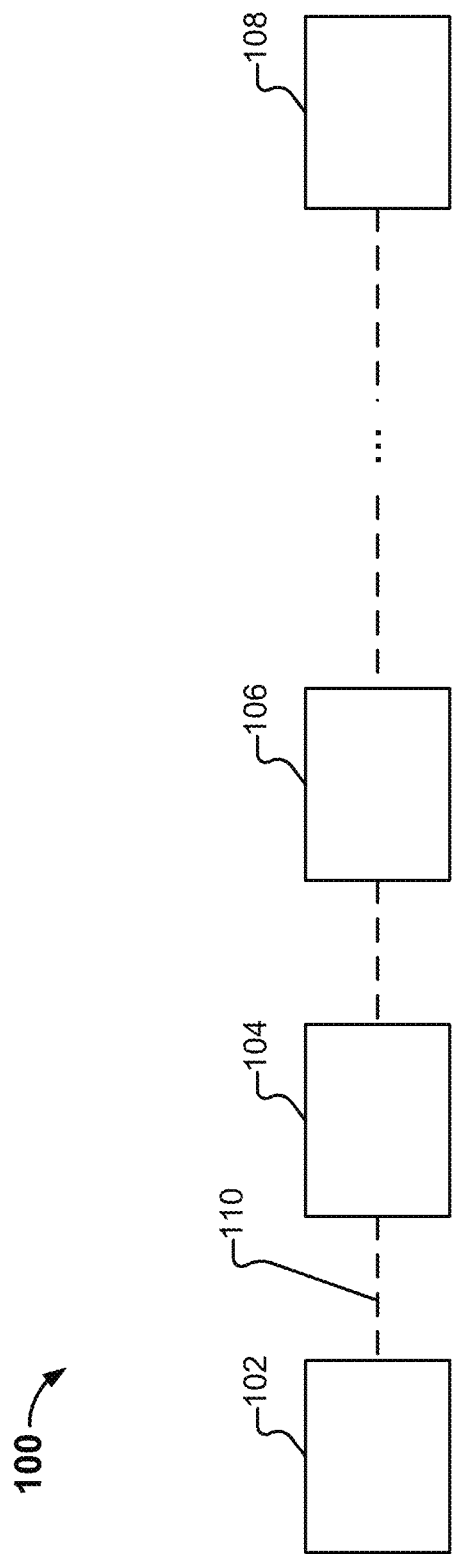
FIG. 1 illustrates an embodiment of a computer system.

FIG. 1 illustrates an embodiment of a computer system. System 100 is also referred to herein as a "software-defined server," an "enterprise supercomputer," and a "mainframe." In the example shown, system 100 includes a plurality of nodes (e.g., nodes 102-108) located in close proximity (e.g., located within the same rack or nearby racks of servers). In other embodiments, multiple racks of nodes (e.g., located within the same facility) can be used in the system. Further, the techniques described herein can also be used in conjunction with distributed systems.

The nodes are interconnected with an interconnect (110) such as 10-gigabit or 40-gigabit Ethernet, direct PCI-to-PCI, and/or InfiniBand. Each node comprises commodity server-class hardware components (e.g., a blade in a rack with its attached or contained peripherals). The interconnect may be dedicated, but need not be. The interconnect may also be high-speed, but need not be. In the example shown in FIG. 1, each node includes multiple physical processor chips. Each physical processor chip (also referred to as a "socket") includes multiple cores, and each core has multiple hyper-threads.

Figure 2:
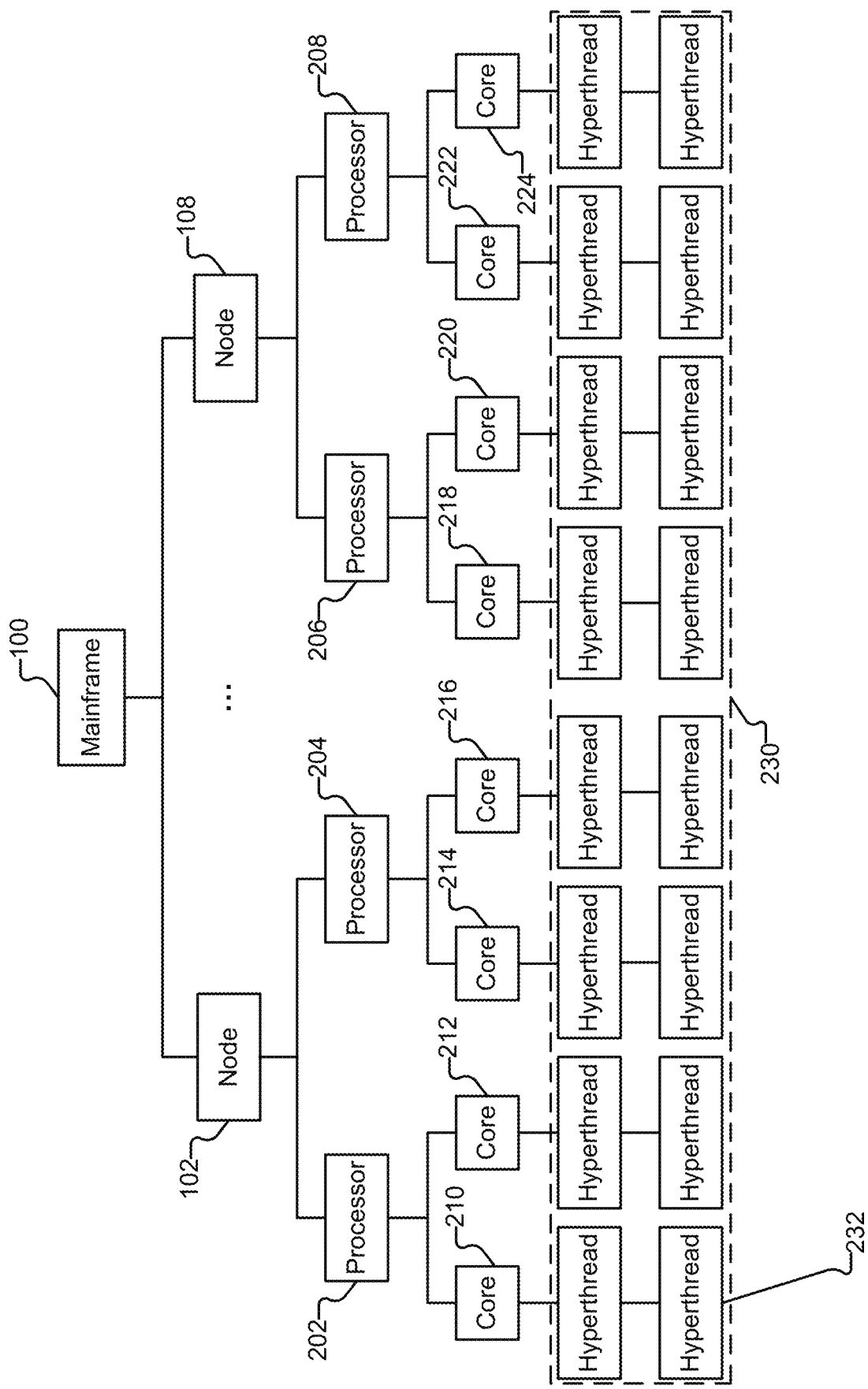
FIG. 2 illustrates the physical structure of the computer system as a hierarchy.

As illustrated in FIG. 2, the physical structure of system 100 forms a hierarchy (230) (from the bottom) of hyperthreads (232), cores (210-224), physical processor chips (202-208), and nodes (102-108 (with nodes 104, 106, etc. omitted from the figure and represented as ellipses)). The tree depicted in FIG. 2 is of a fixed size, defined by the hardware configuration.

As will be described in more detail below, each enterprise supercomputer (e.g., system 100) runs a single instance of an operating system. Both the operating system, and any applications, can be standard commercially available software and can run on system 100. In the examples described herein, the operating system is Linux, however other operating systems can also be used, such as Microsoft Windows, Mac OS X, or FreeBSD.

Figure 3A:
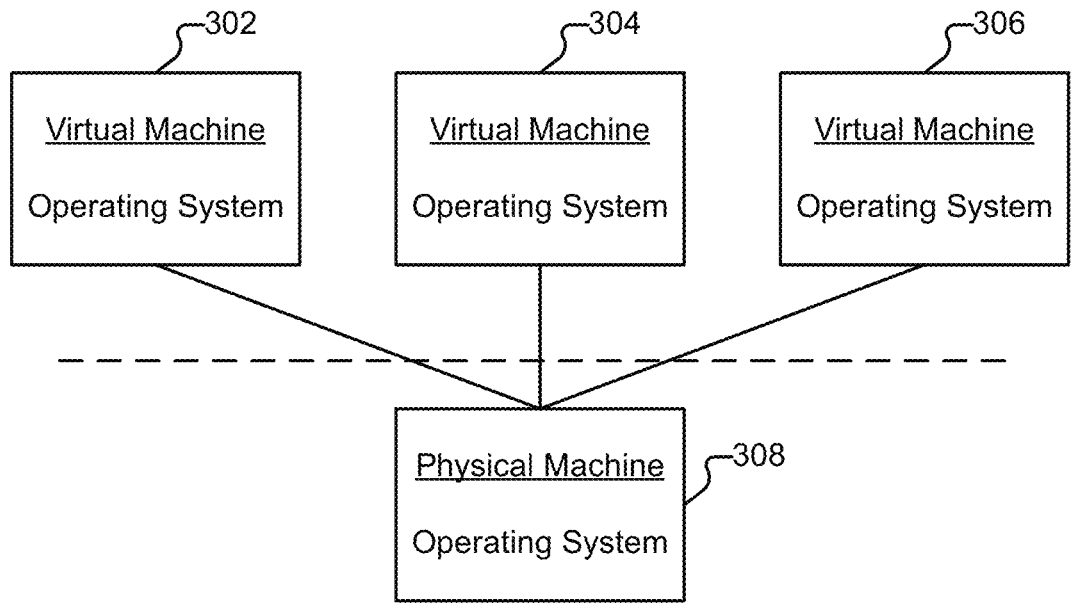
FIG. 3A depicts a virtualized computing environment in which multiple virtual machines (with respective multiple guest operating systems) run on a single physical machine.
Figure 3B:
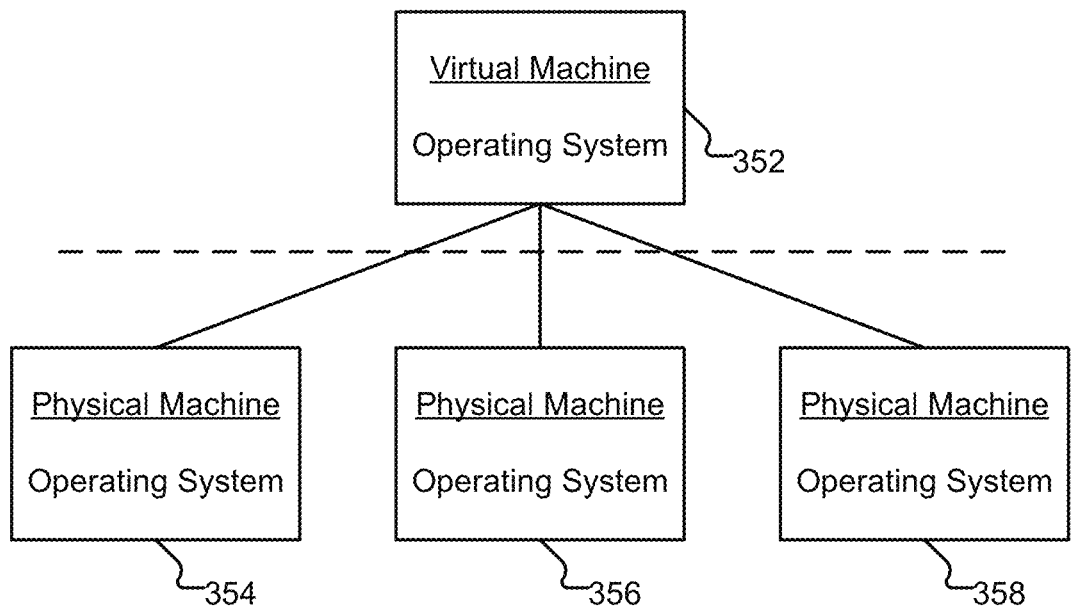
FIG. 3B depicts a virtualized computing environment in which multiple physical machines collectively run a single virtual operating system.

In a traditional virtualized computing environment, multiple virtual machines may run on a single physical machine. This scenario is depicted in FIG. 3A. In particular, three virtual machines (302-306) are running three guest operating systems on a single physical machine (308), which has its own host operating system. In contrast, using the techniques described herein, multiple physical machines (354-358) collectively run a single virtual operating system (352), as depicted in FIG. 3B.

Figure 4A:
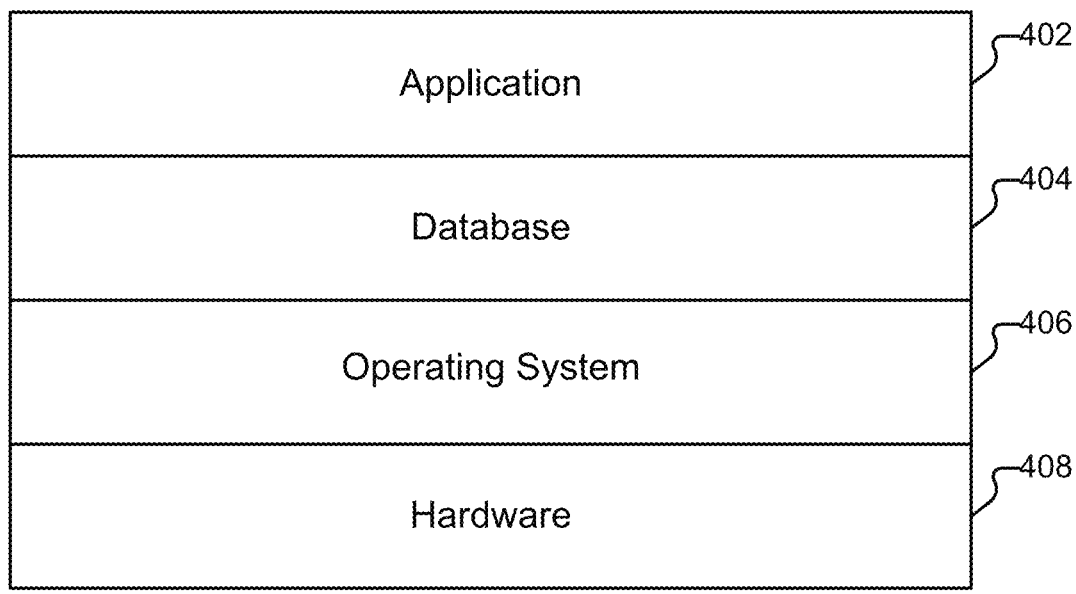
FIG. 4A depicts an example of a software stack.
Figure 4B:
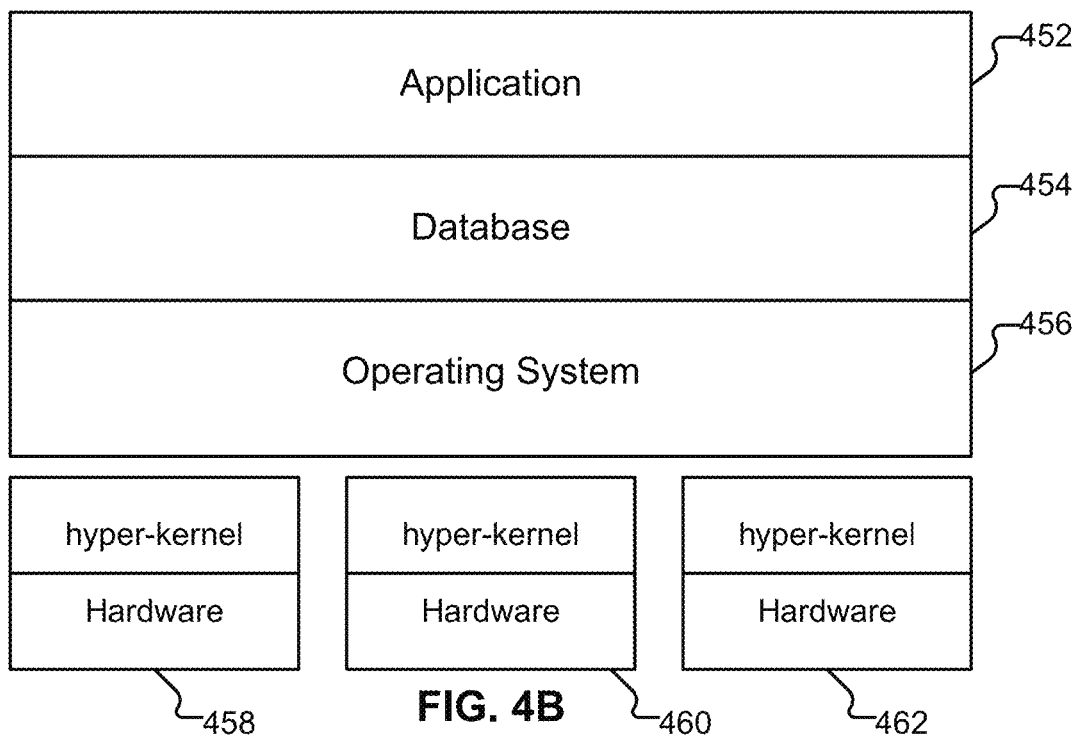
FIG. 4B depicts an example of a software stack.

One example of a software stack is depicted in FIG. 4A. Such a stack may typically be used in traditional computing environments. In the stack shown in FIG. 4A, an application (402) sits above a database engine (404), which in turn sits upon an operating system (406), underneath which lies hardware (408). FIG. 4B depicts a software stack used in some embodiments. As with the stack shown in FIG. 4A, an application (452) sits above a database engine (454), which in turn sits upon an operating system (456). However, underneath the operating system and above the hardware is a layer of software (referred to herein as a hyper-kernel) that observes/monitors the system running in real time and optimizes the system resources to match the needs of the system as it operates. The hyper-kernel (one example of a virtual machine manager) conceptually unifies the RAM, processors, and I/O (Input Output resources for example Storage, Networking resources) of a set of commodity servers, and presents that unified set to the operating system. Because of this abstraction, the operating system will have the view of a single large computer, containing an aggregated set of processors, memory, and I/O. As will be described in more detail below, the hyper-kernel optimizes use of physical resources. The hyper-kernel can also help optimize other I/O system resources such as networks and storage. In some embodiments, based on observations and profiles of running software, performance indicators (hints) are provided to upper layers (e.g., database management systems) about the dynamic performance of the system that can further improve overall system performance.

The hyper-kernel can be ported to all major microprocessors, memory, interconnect, persistent storage, and networking architectures. Further, as hardware technology evolves (e.g., with new processors, new memory technology, new interconnects, and so forth), the hyper-kernel can be modified as needed to take advantage of industry evolution.

As shown in FIG. 4B, operating system 456 is running collectively across a series of nodes (458-462), each of which has a hyper-kernel running on server hardware. Specifically, the operating system is running on a virtual environment that is defined by the collection of hyper-kernels. As will be described in more detail below, the view for operating system 456 is that it is running on a single hardware platform that includes all of the hardware resources of the individual nodes 458-462. Thus, if each of the nodes includes 1 TB of RAM, the operating system will have as a view that it is running on a hardware platform that includes 3 TB of RAM. Other resources, such as processing power, and I/O resources can similarly be collectively made available to the operating system's view.

Figure 5:
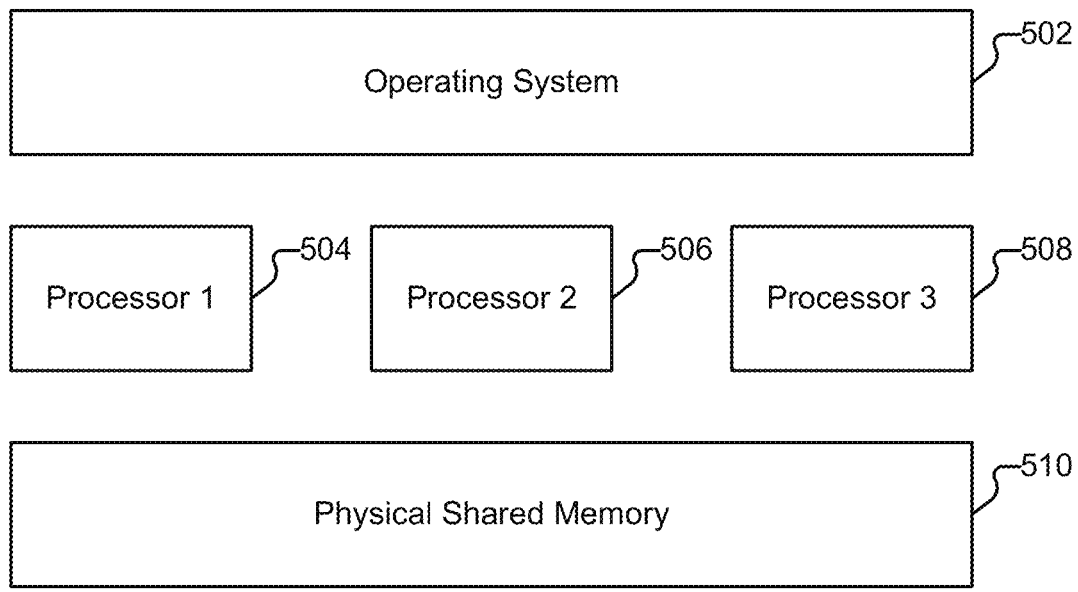
FIG. 5 depicts an example of an operating system's view of hardware on an example system.

FIG. 5 depicts an example of an operating system's view of hardware on an example system. Specifically, operating system (502) runs on top of processors 504-508 and physical shared memory 510. As explained above, an operating system can run on either a traditional computing system or on an enterprise supercomputer such as is shown in FIG. 1. In either case, the view of the operating system will be that it has access to processors 504-508 and physical shared memory 510.

Figure 6A:
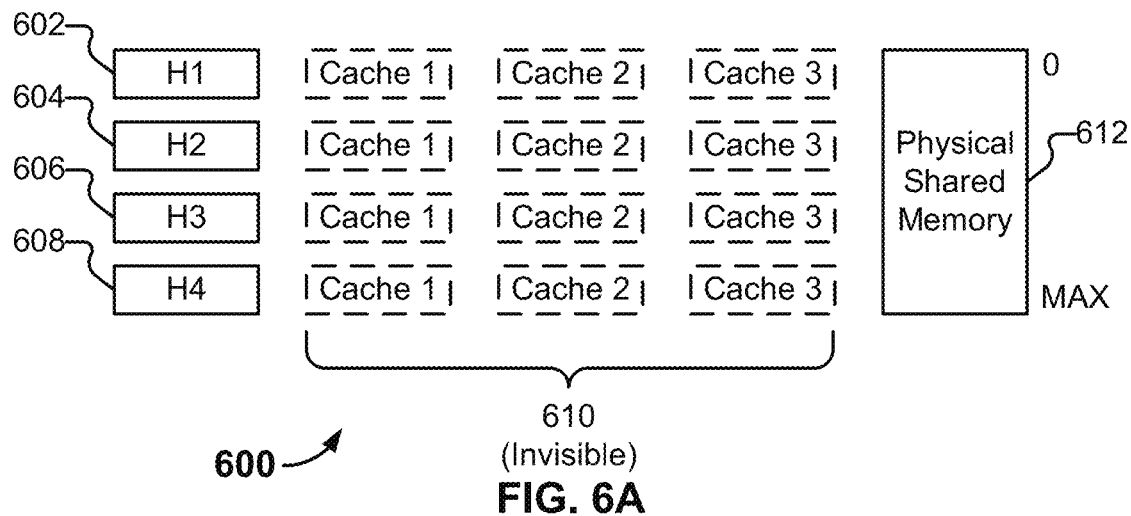
FIG. 6A depicts an example of a hyperthread's view of hardware on a single node.

FIG. 6A depicts an example of a hyperthread's view of hardware on a single node. In this example, a node has four hyperthreads denoted H1 (602) through H4 (608). Each hyperthread can access all portions of physical shared memory 612. Physical shared memory 612 is linear, labeled location 0 through a maximum amount, "max." The node also includes three levels of cache (610).

Figure 6B:
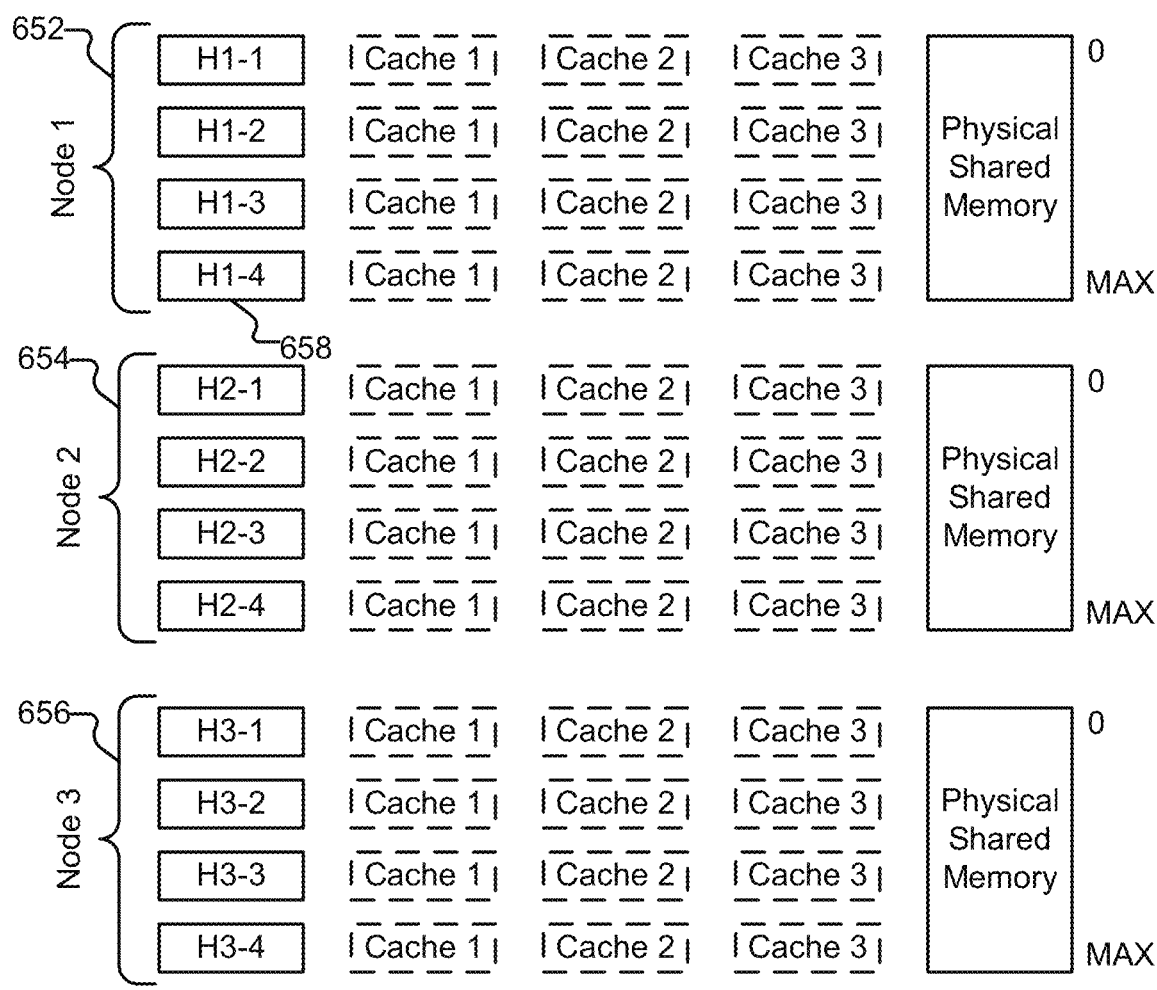
FIG. 6B depicts an example of a hyper-kernel's view of hardware on an example system.

FIG. 6B depicts an example of a hyper-kernel's view of hardware on an example system. In this example, three nodes (652-656) are included in an enterprise supercomputer. Each of the three nodes has four hyperthreads, a physical shared memory, and cache (i.e., each node is an embodiment of node 600 shown in FIG. 6A). A hyperthread on a given node (e.g., node 652) has a view that is the same as that shown in FIG. 6A. However, the hyper-kernel is aware of all of the resources on all of the nodes (i.e., the hyper-kernel sees twelve hyperthreads, and all of the physical shared memory). In the example shown in FIG. 6B, a given hyperthread (e.g., hyperthread 658, "H1-4") is labeled with its node number (e.g., "1") followed by a hyperthread number (e.g., "4").

Figure 7:
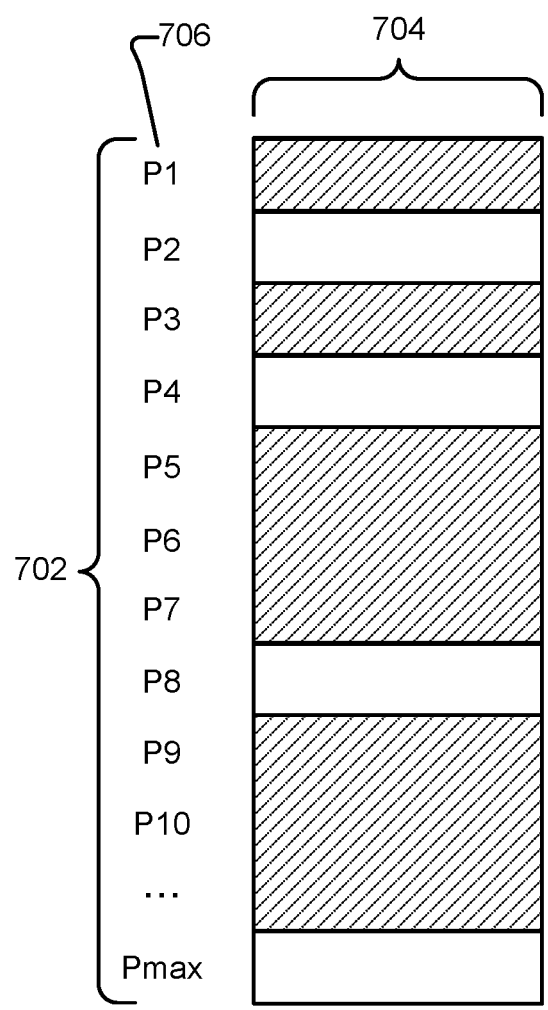
FIG. 7 depicts an example of an operating system's view of hardware on an example of an enterprise supercomputer system.

FIG. 7 depicts an example of an operating system's view of hardware on an example of an enterprise supercomputer system. The operating system sees a plurality of "virtualized processors" (also referred to herein as "virtual processors" and "VCPUs") denoted in FIG. 7 as P1 through Pmax (702). The virtualized processors correspond to the total number of hyperthreads across all nodes included in the enterprise supercomputer. Thus, using the example of FIG. 6B, if a total of twelve hyperthreads are present across three nodes, a total of twelve virtualized processors would be visible to an operating system running on the enterprise supercomputer. The operating system also sees "virtualized physical memory" (704) that appears to be a large, physical, linear memory of a size equal to the total amount of physical memory across all nodes.

As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state. As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state.

Resource Virtualization
Memory Virtualization

As explained above, in the physical configuration, each node has an array of memory addresses representing locations in memory. As such, in a physical configuration with three nodes (e.g., as depicted in FIG. 6B), there are three memory locations each of which has address 0x123456. In contrast, in the virtual configuration, all memory addresses are unique and represent the sum total of all memory contained in those three nodes. In the virtual configuration, all memory is shared, and all memory caches are coherent. In some embodiments, memory is further subdivided into a series of contiguous blocks, with monotonically increasing memory addresses. In the examples described herein, each page has 4K bytes of memory, however, other subdivisions can also be used, as applicable. The term "blocks" is used herein to describe contiguous arrays of memory locations. In some embodiments, the "blocks" are "pages."

Processor Virtualization

A virtual processor (e.g., virtual processor 706 of FIG. 7), as seen by the operating system, is implemented on a hyperthread in the physical configuration, but can be location independent. Thus, while the operating system thinks it has 500 processors running on a single physical server, in actuality it might have 5 nodes of 100 processors each. (Or, as is shown in FIG. 6B, the operating system will think it has twelve processors running on a single physical server.) The computation running on a virtual processor is described either by the physical configuration on a hyperthread when the computation is running, or in a "continuation," when the virtual processor is not running (i.e., the state of an interrupted or stalled computation).

As used herein, a "continuation" represents the state of a virtual processor. Each continuation:

Has processor state (i.e., saved registers, etc.).

Has a set of performance indicators that guide a scheduler object with information about how to intelligently assign continuations to leaf nodes (e.g., hyperthreads) for execution.

Has a virtual-processor identifier that indicates the processor the operating system thinks is the physical processor to which this continuation is assigned.

Has an event on which this continuation is waiting (possibly empty).

Has a state which includes: "waiting-for-event" or "ready."

I/O Virtualization

I/O systems observe a similar paradigm to processors and memory. Devices have a physical address in the physical configuration and virtual addresses in the virtual configuration. When migrating computations (described in more detail below), if for example, there are memory buffers associated with I/O operations, the I/O devices used will likely perform better if they are co-located with the memory with which they are associated, and can be moved accordingly.

Resource Maps

Resource maps are used to translate between virtual and physical configurations. The following are three types of resource maps used by enterprise supercomputers in various embodiments.

A "physical resource map" is a table that describes the physical resources that are available on each node. It contains, for example, the number and type of the processors on each node, the devices, the memory available and its range of physical addresses, etc. In some embodiments, this table is read-only and is fixed at boot time.

An "initial virtual resource map" is fixed prior to the booting of the operating system and describes the virtual resources that are available from the point of view of the operating system. The configuration is readable by the operating system. In some cases, it may be desirable to configure a system (from the viewpoint of the operating system) that does not match, one-to-one, with the underlying hardware resources. As one example, it may be desirable for the operating system to have more memory and fewer cores. This can be accomplished by changing the ratio of memory to cores, i.e., by modifying the initial virtual resource map.

A "current resource map" is created and maintained by each hyper-kernel instance, with one per each node. This map describes the current mapping between the virtual resource map and the physical resource map from the point of view of each node. For each entry in the virtual resource map, a definition of the physical resources currently assigned to the virtual resources is maintained. Initially (e.g., at boot time), the current resource map is a copy of the initial virtual resource map. The hyper-kernel modifies the current resource map over time as it observes the characteristics of the resource load and dynamically changes the mapping of physical resources to virtual resources (and vice-versa). For example, the definition of the location of the Ethernet controller eth27 in the virtualized machine may at different times refer to different hardware controllers. The current resource map is used by the hyper-kernel to dynamically modify the virtual hardware resource mappings, such as the virtual memory subsystem, as required.

Resource Migration Overview

Using the techniques described herein, virtualized resources, such as virtual general-purpose processors, virtual memory, virtual networks, and virtual disks can be migrated between physical locations. Virtual interrupts may also be remotely delivered. As explained above, the operating system is provided with information about the virtualized system, but that information need not agree with the physical system. As long as the basic hardware abstractions expected by the operating system are not violated, a virtual machine may look to the operating system just like a physical machine.

As described above, in the example software-defined server described herein, there is an identical instance of the hyper-kernel running on each node of the cluster that the virtual machine spans.

Due to physical hardware boundaries, a physical processor cannot directly address every guest physical address. When a guest physical address needs to be read or written, it is translated into a physical address that the physical processor can access.

In one embodiment, this is handled through the physical processor's second level page tables. When software makes a reference to a guest (virtual) physical address, if the page of memory containing that address is resident on the node that has the processor that generated that address, the address is represented in the second level page table. Automatic address translation hardware will then translate that address to a guest physical address and then to a real physical address as it normally does by using the first and second level page tables, with no performance degradation.

However, if the memory address is not present in the second level page table, the hardware cannot completely translate that guest address to a real physical address, and the processor generates an interrupt. The hyper-kernel fields that interrupt and analyzes the request (similar to what an operating system might do when it needs to copy a page that is not memory-resident but is only resident on a backing store). This analysis may result in a request for that page to be sent (migrated) to the node from a different node, or it may result in a decision to migrate that virtual processor to the node that has that page of memory. Page reads and writes may be handled differently. For example, readable pages may be replicated, but a writable page requires additional overhead to remove that page from the L4 cache of other nodes that may have a copy (i.e., invalidation).

In one embodiment, to migrate a virtual processor, the hyper-kernel takes a snapshot of the state of the processor (e.g., a continuation, using 6400 bytes of data, or any other amount as appropriate) and sends it in a message over the dedicated interconnect (e.g., Ethernet) to the chosen destination, where the suspended virtual processor may be restored onto another physical processor (e.g., implemented as a hyperthread of a processor core) at the destination node. Saving and restoring processor state may be implemented using hardware mechanisms provided by processors supporting virtualization. Since the program counter has not advanced by the interrupt, the instruction may then be safely restarted. Since the page and the virtual processor are now co-resident, the virtual processor may continue running. It is possible that in some cases the instruction generates additional interrupts to access different non-resident pages, but the mechanism that is used may be similar or the same. When the virtual processor migrates, its updated location is recorded (e.g., in the resource maps described above). However, for reliability, perfect location knowledge is not assumed, as the virtual processor may have subsequently re-migrated.

In the following example of resource migration, suppose an enterprise supercomputer holds a large in-memory database, larger than can fit into a single node. Part of the database is in a first node, "node1." Suppose one of the cores on a different node, "node2," is trying to access data that is owned by node1 and that does not reside locally in a cache on node2. The core on node2 will receive a memory access violation because it is trying to access data that it believes it should be able to access (but cannot). As will be described in more detail below, the exception is handled in the hyper-kernel.

One way that the situation can be resolved is by moving the needed area of memory to node2, and then returning control back to the operating system (which, in turn, returns it back to the database system). The software can then proceed as intended (i.e., as if the access violation never occurred).

In many cases, there may be one or more other cores in other nodes (e.g., "node3") that are also trying to access the same area block of memory as needed by node2 above. Node3 might be attempting to access the same data, or it might be accessing different data contained in the memory that was moved (also referred to as "false sharing"). The data could be moved to node3, but if the core on node2 asks for the data a second time, the data would need to be moved back to node2 (i.e., potentially moving the data back and forth repeatedly), which can be slow and wasteful. One way to avoid moving data back and forth between cores is to recognize that both cores and the associated block of data should be co-located. Using the techniques described herein, the memory and the computation can be migrated so that they reside on the same node. Doing so will result in a higher likelihood of faster access to data, lower overhead, and a higher probability of sharing data stored in local caches.

When the access violation occurs, an event is triggered (in a system dependent way) to which the hyper-kernel responds. One example of how such an event can be handled is by the invocation of a panic routine. Other approaches can also be used, as applicable. As will be described in more detail below, the hyper-kernel examines the cause of the event and determines an appropriate strategy (e.g., low level transaction) for handling the event. As explained above, one way to handle the event is for one or more blocks of hyper-kernel virtualized memory to be transferred from one node's memory to another node's memory. The transfer would then be initiated, and the corresponding resource maps would be updated. A continuation would be built poised to be placed in a local table in shared memory, referred to herein as an "event table," so that the next thing the continuation does when it is resumed would be to return control to the operating system after the transfer is completed. Alternatively, a decision could be made to move the virtual processor to the node that contains the memory being requested or to move the virtualized memory (and its virtualized memory address) from one node to another. Different decisions for how to handle the stall may be based on the characteristics or context or cause of the stalling event. In various embodiments, the hyper-kernel makes three decisions when handling an event: which (virtual) resources should move, when to move them, and to where (in terms of physical locations) they should move.

Network Attached Memory

Described above are example embodiments of a hardware and software architecture in which a cluster of tightly coupled servers (also referred to herein as a "TidalPod" or "Software-Defined Server" (SDS)) share an aggregated set of resources. These resources include several types, such as processors, dynamic memories, storage, and networks. The aggregation of these resources by a hyper-kernel in such a system allows for the construction of a virtual machine that spans the set of nodes and appears to an operating system and to applications as a single large server.

Described herein are techniques for extending aggregation of resources by a hyper-kernel to include memory technologies such as flash memory, PCM (phase change memory), 3D-XPoint, hard disk drives, etc. While example embodiments involving flash memory are described below, the techniques described herein can variously be adapted to accommodate any type of memory technology, as applicable.

In one example embodiment, flash memory is organized as a physical array of bytes. Each byte of this array corresponds to a physical memory address in the virtual machine created by the set of hyper-kernels running on each server (also referred to herein as "nodes") of the cluster.

Typically, flash memory is used in two main ways: as solid-state disks (SSD) or as persistent memory in portable electronic devices such as mobile phones and tablets. One example primary usage for flash in servers is to simulate disks. Described herein are techniques that provide additional ways of using flash, for example, as a persistent backup memory to (a) make large memories available for use by applications and databases by extending the size of the memory as perceived by a guest operating system beyond that of the sum of the available dynamic memory of the cluster and (b) as a way to make systems more resilient in the presence of errors.

Memory Hierarchy

In the example architecture presented above, a large "physical" address space is presented to a guest operating system. From the point of view of each node in the cluster, there are addresses in that "guest physical" address space as seen by the operating system whose guest physical addresses are directly addressed by the processors on that node. In some embodiments, if the guest physical address requested by a processor is not present on that node, a memory access fault is generated by the hardware, and either (a) the memory that contains that address is moved or copied to the node where the processor is located, or (b) the computation the guest processor was executing (i.e., the virtual processor representing the guest processor) is moved to the node where the guest physical memory is located. Examples of resource migration mechanisms and techniques using a hyper-kernel are described above. Either of these two strategies, once completed, enables the computation to be made available to be scheduled and, once scheduled, ultimately begins to run again, as if the memory access fault never happened.

In some embodiments, in this model, at any given time, the "guest physical" memory is owned by at most one node in the system. Other nodes may have copies of this memory, but, in some embodiments, in order to maintain strong cache coherency, when a guest processor modifies the page, either all the other copies must be marked as invalid, or otherwise forgotten.

In some embodiments, each page of dynamic memory in the system can be a local copy of some other memory, i.e., an alternate flash memory or a networked attached flash memory. This flash memory may be centrally located in a flash appliance accessible to all of the nodes in the cluster, or it may be distributed in parts throughout the cluster, on one or more nodes (e.g., on PCI cards including flash memory on one or more nodes).

Such an array of flash memory is referred to herein, without loss of generality, as a "network-attached memory." The network-attached memory (also referred to herein as a "NAM") may be composed itself of one more banks of memory distributed amongst the nodes of the cluster. In various embodiments, the network-attached memory can be implemented using memory technologies, such as PCM, 3D-XPoint, hard disk drives, etc., as described above, with the techniques described herein variously adapted, as applicable. An example of a network-attached memory is described in further detail below.

The network-attached memory can be used as an additional layer of memory in a TidalPod. In one example embodiment, the network-attached memory can be considered as the "real" home of all memory in the system (e.g., TidalPod). When the network-attached memory is considered or used or configured in this manner, then parts of the network-attached memory may temporarily reside on each node, for example, in the dynamic memory of the node. When considered in this way, the memory in each node can, in some embodiments, be used as a cache of the network-attached memory.

An example of a network-attached memory appliance is described in further detail below in conjunction with FIG. 9.

In some embodiments, the set of nodes in a TidalPod that contain memory is extended to include the flash appliance. The flash appliance is treated as another distinct resource type in the system. The flash appliance can be thought of as similar to the other nodes except that, in some embodiments, it does not have any virtual processors on which computations can be scheduled. In some embodiments, the network-attached memory appliance does not start off with any virtual processors, and never accepts any virtual processors from other nodes in the TidalPod.

Figure 8A:
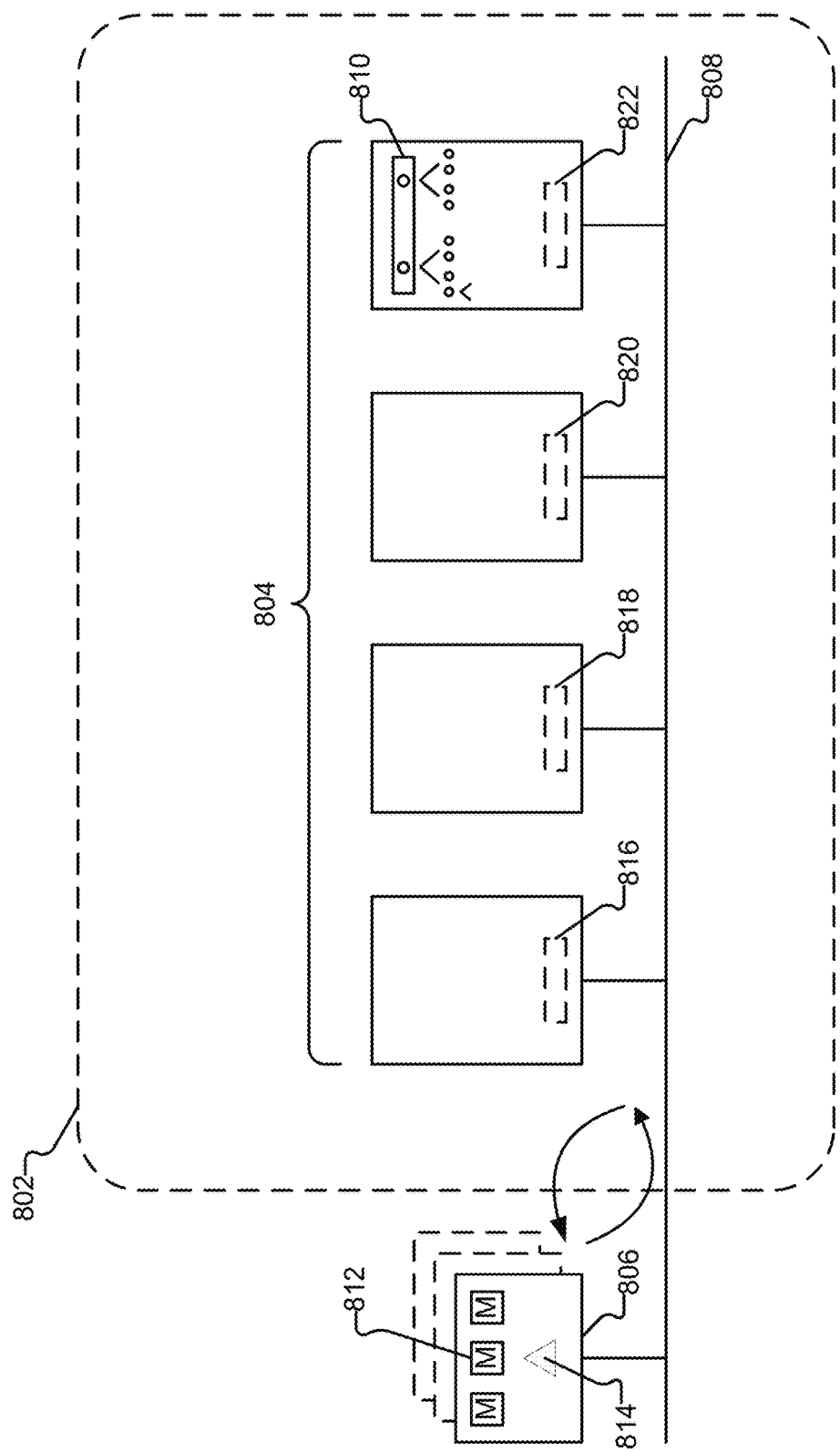
FIG. 8A illustrates an example embodiment of a system in which a network attached memory is used in selective resource migration.

FIG. 8A illustrates an example embodiment of a system in which a network attached memory is used in selective resource migration. In the example shown, nodes 804 (examples of nodes 458-462) of TidalPod 802 communicate with a network-attached memory 806 (e.g., an array of persistent memory). In some embodiments, the nodes and NAM together form the TidalPod (where the NAM is a specialized node in the TidalPod). In some embodiments, the nodes and the NAM of the TidalPod communicate with each other over an interconnect (808).

In one example embodiment, each of nodes 804 includes a motherboard (810), where the motherboard may have a number of processors, where each processor may have a number of cores, and each core may have a number of hyperthreads, as described above. In some embodiments, the guest operating system running on the TidalPod views each hyperthread as a processor.

In some embodiments, the network-attached memory 806 is an array of memory (812) (e.g., bytes of flash memory). The NAM also includes a processor (814) configured to implement a cache coherency protocol. Multiple NAMs may be used for redundancy and/or resiliency. In this example, the network-attached memory appliance 806 is centrally located in a flash appliance accessible to all of the nodes in the cluster. In other embodiments, the network attached memory may be distributed in parts throughout the cluster, on one or more nodes (where examples of portions of the NAM distributed across nodes 804 are shown at 816-822).

Pages of memory may be placed in the NAM, just as pages of memory can be put on any node in the system (e.g., when performing memory migration). In some embodiments, the network-attached memory appliance communicates with the other nodes in the TidalPod over the interconnect using a cache coherency protocol.

Figure 8B:
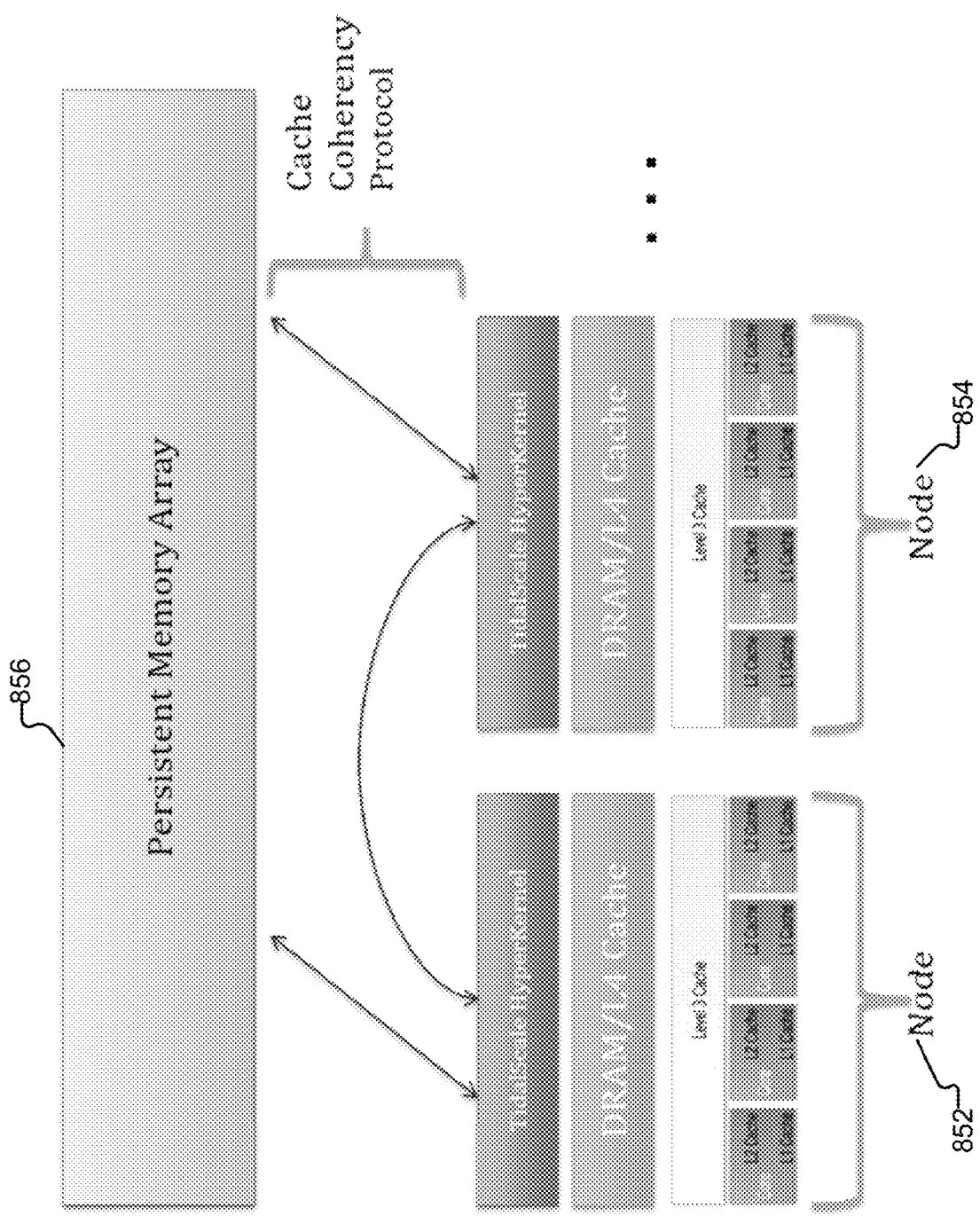
FIG. 8B illustrates an example embodiment of a system in which a network-attached memory is used in selective resource migration.

FIG. 8B illustrates an example embodiment of a system in which a network-attached memory is used in selective resource migration. In this example, nodes 852 and 854 are examples of nodes 804 and 458-462. As shown in this example, each node has a hyper-kernel. Also shown is an example embodiment of a memory or cache hierarchy on each node, which includes L1, L2, and L3 caches. Each node also includes DRAM, used as an L4 cache.

As shown in this example, nodes 852 and 854 communicate with each other (e.g., over an interconnect), for example, migrating resources between each other. In this example, the nodes are also configured to communicate with persistent memory array 856, which is an example of a network-attached memory. The NAM and the nodes of the TidalPod communicate using a cache coherency protocol.

Figure 9:
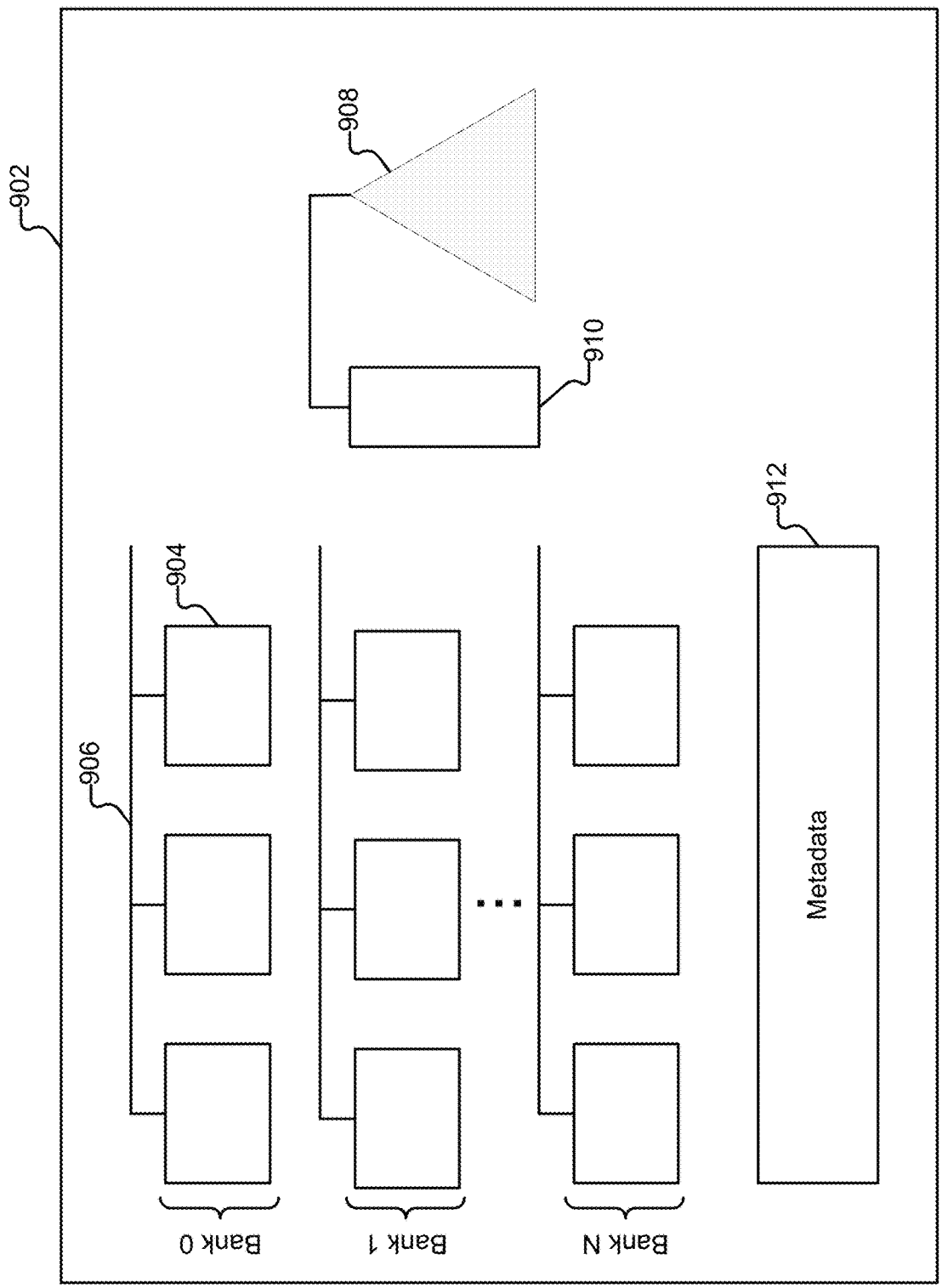
FIG. 9 illustrates an example embodiment of a network-attached memory appliance.

FIG. 9 illustrates an example embodiment of a network-attached memory appliance. One example implementation of a NAM is as follows. The NAM (902) includes a number of flash memory chips (e.g., memory chip 904) arranged in a 2D (two-dimensional) array on a board. In this example, the memory chips are arranged in banks and rows. The memory chips are connected on a memory bus (906). The memory bus allows a processor (908) to put out addresses to a memory controller 910 (e.g., address specifying bank X, chip Y, page Z), which is then configured to return the appropriate page from the specified combination of bank/chip. For example, the memory controller takes the total number of chips, divides that by the number of pages on a chip, divided by the number of rows, etc. to return the appropriate page.

In this example, the processor included in the NAM is a coordinator, implemented, for example, as a special limited processor, a network processor, or a protocol processor that is configured or programmed to communicate with other nodes in the TidalPod, for example, receiving messages and providing responses as part of a cache coherency protocol, which will be described in further detail below. In some embodiments, the messages include acknowledgments, retries, etc. that are communicated between nodes of a TidalPod. One example of a message is a message to migrate a vcpu on node n to a node m. Example pseudocode for such a message is provided below:

Migrate this VCPU "V" to node M
Snapshot the state of V (typically a small number of pages of memory (e.g., ~6400 bytes))
Send "migrate" command with the appropriate number of bytes to contain the state V to M (e.g., 6400 bytes)
Wait for Acknowledgment In this example, the NAM also includes metadata 912. In some embodiments, the metadata includes page state data used to keep track of which pages are in what state. In some embodiments, the page state data indicates the type of the page (e.g., secondary). In some embodiments, the NAM includes metadata that indicates the state of the page on various nodes throughout the TidalPod. For example, the state of the copy of the page on the NAM is typically a secondary. Copies of the page on other nodes may be secondary, prime, or exclusive. This information can be used, for example, when performing a recovery in a fail over scenario, to restore the state of the TidalPod (e.g., to indicate that a copy of the page on a first node in the TidalPod should be marked as primary (also referred to herein as "prime"), while another copy of the page on a second node should be marked as secondary).

Software-Defined NUMA Domain.

Described herein are techniques and embodiments relating to what is referred to herein as software-defined NUMA (non-uniform memory access). In the below examples and embodiments, for illustrative purposes, all references to memory are assumed to be un-cached.

In modern hardware and software parallel architectures, there are significant latencies between processor cores and memory. For example, in a quad socket motherboard, there are a number of cores (which may have a number of hyperthreads) in each socket. Also associated with the socket is a bank of memory. When a core in that processor socket accesses memory associated with that socket, the access is generally fast. However, if a core accesses memory associated with a different socket on the same motherboard, access to that memory slows down.

Modern operating systems have NUMA capabilities (Non Uniform Memory Access). If the operating system knows the physical topology of the motherboard, it can assign relative latency metrics, and then use that information to optimize processes so that the latencies are minimized. It is not only operating systems that can manage NUMA topologies. If an application (such as a data base management system) can query operating-system provided topology information, it can use that information to make sure that the processes are assigned to processors to use memory in the same NUMA domain, thus minimizing latency, and reducing overall elapsed time.

Now consider a software defined server, such as that described above, which includes multiple computing nodes, each with its own motherboard(s). A socket on one node may access memory on a different node. While the hyper-kernel is able to handle this, it may involve migration of memory or migration of a virtual processor. This will result in slower access to that memory residing on a different node. Thus, in the case of a software-defined server, a socket has fast access to local memory, slower access to memory on the same motherboard, and much slower access to memory on a different node.

As described above, on a typical computing system, modern operating systems with NUMA capabilities can assign latency metrics based on the physical topology of the computing system, and then use that information to optimize processes so that the latencies are minimized. However, in a software-defined server, this may be difficult. For example, while a virtual server with a virtual motherboard may be presented to the guest operating system, the actual physical topology need not match the presented virtual motherboard, and in reality, virtualized resources may be moved amongst the various computing nodes. For example, the virtual processors are mapped and remapped to physical processors on a dynamic basis. As a result, determining the topology of the virtual processors and guest physical memory to the physical topology is challenging in the presence of processor and memory migration (as the virtual topology presented to the guest operating system is not necessarily the same as the actual physical topology, of which the guest operating system may not necessarily be aware).

Example Solution Overview

In one embodiment, the aforementioned challenges to facilitate NUMA capabilities on a software-defined server are addressed by creating what is referred to herein as "software-defined NUMA domains." As will be described in further detail below, in contrast to NUMA domains on existing computing systems, the software-defined NUMA domains described herein do not have to correspond at all to the actual physical topology. Indeed, the software-defined NUMA domains described herein do not have to conform to an existing motherboard. Rather, the topology can be defined via definition/specification of "virtual" or "software-defined" access latencies between memory local to a socket, local to a motherboard but attached to a different socket, or even memory on a different motherboard. Topologies further away than that (such as the network-attached memory described above) may also be defined. Any software-defined NUMA domains that are desired can be defined, each having arbitrary numbers of virtual processors, and virtual guest physical memory.

Consider the below example virtual access latency table of Table 1, in which the columns and rows represent relative access times across software-defined NUMA domains. The first column is the relative time a processor in that software-defined NUMA domain needs to access memory in each of the other software-defined NUMA domains. This could represent a virtual quad-socket motherboard, so four software-defined NUMA domains can be used, one for each socket. Only two latency values are used in this example corresponding to cores in each socket accessing local memory, and memory local to a different socket.

TABLE 1

| 10 | 250 | 250 | 250 |
| 250 | 10 | 250 | 250 |
| 250 | 250 | 10 | 250 |
| 250 | 250 | 250 | 10 |

The first column represents the relative time to access memory local to that socket (i.e., 10). From the perspective of the guest operating system, this corresponds to being "in domain." The other relative latencies are 250 (25 times slower) if the processor needs to fetch memory attached to a different socket on the same motherboard (e.g., out of domain), and so on. While the values shown in this example are 25 times apart, this does not imply that the access times are 25 times apart (even in hardware NUMA, a multiple of 3 times on the values in the table does not imply 3 times the access times). Rather, the numbers presented in this example may be considered as relative latencies/penalties, but not directly correlated with actual time multiples.

The above may be extended to multiple nodes, each containing a motherboard. For example, as will be described in further detail below, more rows and more columns may be added, with different latency profiles.

Now, if an application is NUMA aware, and is provided such a software-defined NUMA domain topology, it will attempt to allocate virtual memory and processes in such a way as to optimize (i.e., reduce) access latencies. In a software-defined server, this will have the effect of building working sets (sets of pages of memory that are typically worked on together) that are well-formed. This will result in improved performance of the software-defined server, as the hyper-kernel will not typically experience a stall on a well-formed working set (where, for example, virtual processors and the set of pages of memory they need are co-located, rather than being separated on different nodes).

By creating a software-defined NUMA domain, and by providing this direct guidance to a guest operating system (and thereby indirect guidance to an application or database management system running on the guest operating system), those systems have been given the ability to self-optimize. Since, in some embodiments, the hyper-kernel only migrates resources on stalls, if the stalls are reduced or even eliminated, there will be reduced or eliminated migrations, and access patterns will occur with little or no overhead at hardware speeds.

Further embodiments and details regarding software-defined NUMA domains are described below.

Additional Embodiments and Details Regarding Software-Defined NUMA Domains

There are various challenges and issues with NUMA on existing computing systems. For example, given the operating system that stands in between the virtual address and physical address, it is challenging to have a handle on what the physical address is where NUMA is concerned with the physical address.

Operating systems such as CentOS have a command known as "numactl." If this command is respected (which OSes are supposed to do), the running of this command may have a positive effect. However, it is difficult to see this positive effect being realized. That is, the expected performance improvements may not be realized.

The purpose of the numactl command is to circumvent such limitations and actually bind the command in the context of the numactl command, in order to treat an entire sub-computation differently.

When executed, numactl runs this command on that new domain. There are many opportunities for misusing a feature that the OS (operating system) provides, but these may be a relatively minor problem.

One major challenge for systems such as the software-defined server described above is that there is an extra level of indirection that the (guest) operating system, even if it is performing well, is not aware of. For example, the true physical topology is typically never given to the (guest) operating system because it is difficult to keep it up to date (due to migration of virtual processors and pages of memory amongst computing nodes).

This is also because the guest operating system believes it is controlling physical memory and physical processors. In the case of the software-defined server, the guest operating system is not. While one possible option would be to keep the topology presented to the guest operating system up to date, this may be difficult, as migrations and other actions may be happening in relatively small amounts of time, such as on the order of a hundred microseconds or nanoseconds.

Thus, in the presence of migration of memory and processors, whatever the "physical" topology that is presented to the guest operating system is destroyed in a very short amount of time. However, what the true physical topology is may not be consequential, and using the techniques described herein, a software-defined NUMA topology may be provided, where a guest operating system or application running on the guest operating system may make use of that software-defined/virtual topology (which the guest believes is an actual physical typology) to make decisions. What results is that in some cases, the physical topology (i.e., placement of virtualized resources such as virtual processors and memory on NUMA domains that are mapped to physical computing nodes) and the virtual topology of NUMA domains converges.

The techniques described herein are referred to herein as being "goal directed," as the software-defined NUMA typology is a goal that is set for what the physical topology is desired to look like down the road. Further, it is assumed that an application (e.g., a database) interested in this information will access that NUMA domain topology (which again it believes is a physical topology, but it is not, it is a virtual topology) and use the software-defined NUMA domain topology information (and accompanying relative latencies) to make decisions. The software-defined topology is not changed, so eventually it converges. What the application is told is that the physical topology (placement of virtualized resources on the computing nodes—e.g., working set formation) exhibits the performance characteristics of the virtual topology, which achieves the physical characteristics of the physical topology, asymptotically.

Thus, a goal is set and the entities who are interested in achieving it are allowed to use it.

Figure 10:
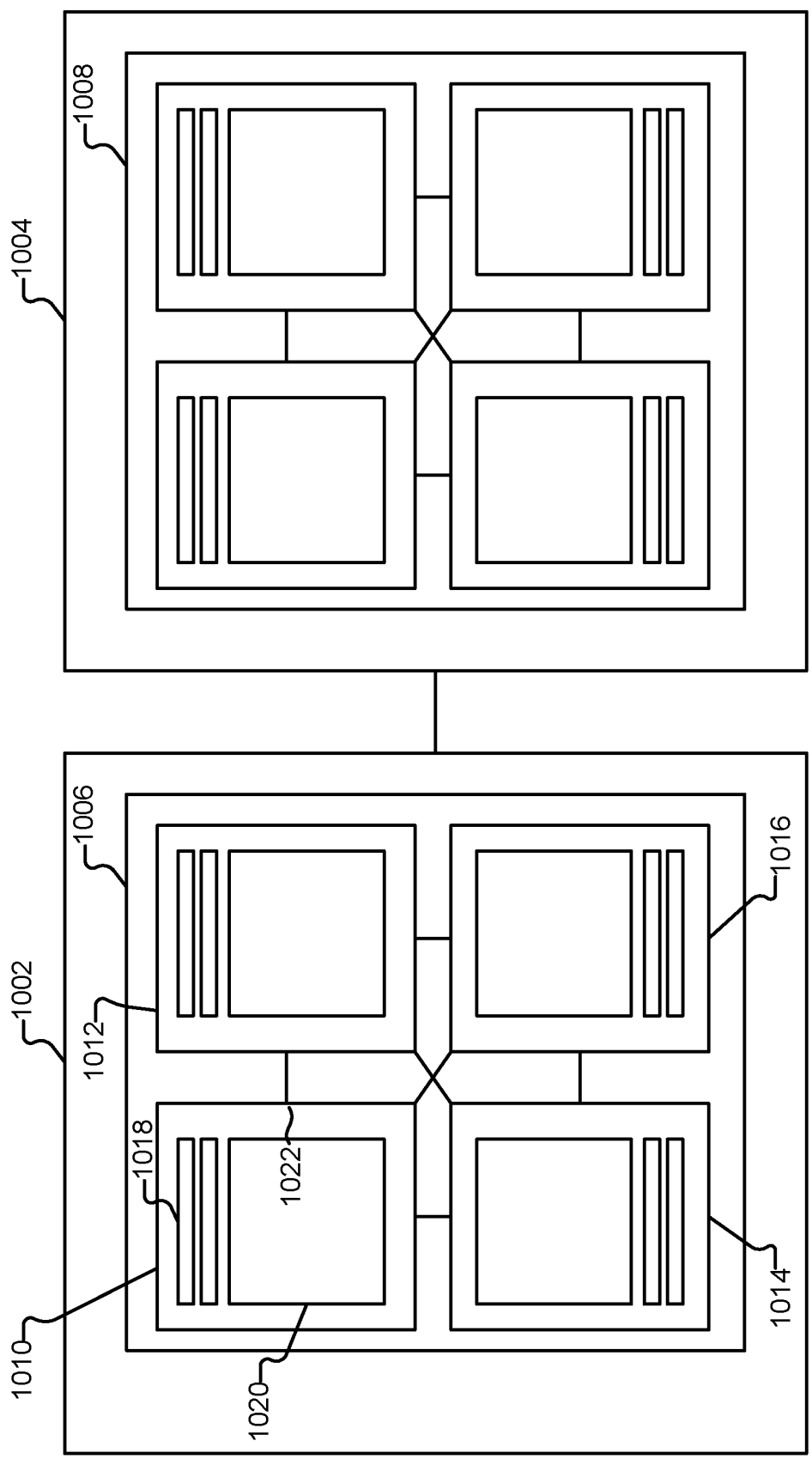
FIG. 10 illustrates an embodiment of a sample physical NUMA configuration.

FIG. 10 illustrates an embodiment of a sample physical NUMA configuration. In this example, two physically interconnected computing nodes (1002 and 1004) are shown. Each node has a motherboard (1006 and 1008). Each motherboard has four sockets (e.g., sockets 1010, 1012, 1014, and 1016) in this example.

In this example, each socket of the motherboard has a bank of memory (e.g., DRAM 1018) and a processor (e.g., processor 1020). There is also an inter-connect (e.g., 1022) connecting the sockets of the motherboard. There is also an interconnect connecting the two computing nodes (and therefore connecting the two motherboards). Suppose there is a core on one socket accessing memory over on another socket on the same motherboard. Referring to the example of Table 1, this has a latency of 250 units. Whereas, a core or a hyperthread of a processor on a socket accessing memory local to the socket has the shortest latency of 10.

Other latency values, such as 20, instead of 10, could be used. However, the latency need not be a tight time limit because it may depend on various other factors such as caches and congestion on interconnects, among other things. However, for illustrative purposes, as shown in this case of a four-socket motherboard, there are differences in memory access time (for simplicity or illustrative purposes, suppose that caching effects are ignored here).

While processors do have caches, even if assuming no caches for this example, this may not necessarily change things. Looking at the differential of FIG. 10, for emphasis, relative latencies of 10 and 250 were used. However, if there were another motherboard, and a socket accesses some memory on a socket on another motherboard (e.g., cross-node memory access, where each motherboard is on its own node), the latency may not be 250 anymore—it may be 2,500 or 5,000, but the principle remains the same.

In some embodiments, a command such as numactl coordinates with the operating system. Numactl, when executed, indicates, for a given process and any children that it runs, and any threads that it runs, the CPU pool that it can run on should be limited, and when memory is allocated for it, in terms of the virtual-to-physical allocation, it should coordinate with a NUMA domain that was specified to use locally.

A user can specify, for example, that they would like a process and threads to be in a specific NUMA domain (e.g., NUMA domain two). Now suppose the operating system knows that NUMA domain two has memory from, for example, zero to one terabyte. In this example, suppose there is four terabytes of memory in the system, with four NUMA domains. There are also 64 processors, where the first 16 processors and the first terabyte of memory are in NUMA domain one, et cetera. The guest operating system obtains that information from what it is being told at boot time, for example, by querying the hardware. As one example, ACPI tables are used.

A user running the numactl command can control, in the operating system, which memory pool and CPU pool they want to use to optimize latency. Other mechanisms other than numactl may also be used. For example, libraries may be used for applications such as SAP HANA.

In a software-defined server, using a command such as numactl can be challenging, because, as described above, the binding between virtual processors and the physical processors that instantiates or runs those virtual processors changes dynamically.

The software-defined NUMA domain technique described herein allows for the use of NUMA to optimize for latency reduction in a software-defined server.

The latencies observed in the software-defined server may be on a different order than the latencies observed in normal physical NUMA domains. In the above example of Table 1, a value of 250 was used. This may be an upper limit on the allowed value that can be inputted, where the observed value may be on a different order of magnitude, say 25,000. However, as it is a virtual environment that is being created by the hyper-kernels in the software-defined server, any relative virtual access latency values may be placed in the table.

For locality purposes of trying to match memory to processor, the physical processor must be on the same machine/node as the physical memory to be able to access it at the moment. The hyper-kernel attempts to establish that locality, where there may be various considerations on assigning processes to physical processors to run.

For example, in FIG. 10, where there are two nodes, in order for a vCPU to run on a first node, and access a page on the other node, either that page would have to be moved over, or the vCPU would have to be moved over. A determination is to be made (e.g., using the resource migration techniques described herein) of whether the page should be moved preemptively, or whether the vCPU should be moved. Described below is a way to make that decision in light of a software-defined NUMA domain.

To obtain optimal performance (or desired latency reduction), it would be beneficial if working sets (e.g., set of pages needed by a set of threads) could be identified. In some embodiments, working sets are less than one node in size (otherwise, memory may be thrashed back and forth). With respect to establishing memory-CPU domains, or at least memory domains, if it is determined that a given CPU is accessing a certain portion of memory, which is on another domain, then it may be desirable to move the CPU rather than move the memory. However, this may result in trying to lock the CPU and the memory to one of the nodes.

Using the techniques described herein, these working sets may be artificially constructed. For example, numactl constructs working sets in a different way.

Using the techniques described herein, attention need not actually be paid at the hardware layer. The system "lies" to the guest operating system (e.g., presents a virtual environment to the guest operating system that does not physically exist). This is a capability of the software-defined server system described herein. As one example of the guest being "lied" to, the guest may be told that there are 250 cores when there are only 17, or for example, the guest operating system may be told that there are 64 cores when there are actually 250 cores. As another example, the guest operating system can be told that it has five terabytes of memory, when a node may have only one terabyte.

When running guest operating system kernels such as Linux 4 and 5, it may be observed that the operating system attempts to respect NUMA domains. By doing so, it is establishing a vCPU to memory (guest physical address) correlation, in effect, working to establish a working set and page locality. Here, the hyper-kernel may make migration decisions in light of the goal of the vCPU to memory correlation indicated by the software-defined NUMA domain configuration/specification. However, while the hyper-kernel is aware of the desired page locality (e.g., vCPU to memory correlation and NUMA domain assignation of processors/memory), it need not enforce that locality 100% of the time, but, as described above, may use it as a goal in biasing its migration decisions (e.g., on stalls).

A NUMA-aware operating system, through the use of mechanisms such as numactl, attempts to make best efforts at optimizing latencies. The hyper-kernel, using the software-defined NUMA domain techniques described herein, may make best efforts at optimizing latencies. However, there is not necessarily a guarantee 100% of the time.

Memory Load Testing in a Numa-Aware Linux Guest

The following is an example of memory load testing in a NUMA-aware Linux guest.

In this example, consider the CentOS operating system running as a guest on a software-defined server. While CentOS is used in this example, the techniques described herein may be variously adapted to accommodate a variety of platforms and operating systems including Linux, FreeBSD, Windows Server, etc.

When presented with a NUMA topology the CentOS Linux guest will recognize the provided topology and provide tools, utilities, and APIs to interface with the NUMA policy supported by the Linux kernel.

Numactl provides a user interface, and the libnuma library provides a programming interface that allow the user to assign processes to CPUs and or domains. In this example, monitoring memory usage within the NUMA domains is provided by both numactl and numastat.

The following is an example test program that may be used to verify the Linux management of NUMA domains. In this example, a test program was created which allocates 20 GB of RAM and walks through each of the pages modifying some bytes, forcing them to be mapped in. Once the memory has been mapped in it continues to walk the pages N times.

The test configuration is a two node SDS (software-defined server) with 180 GB of RAM which has been configured with four software-defined NUMA domains.

Here, in this example, each computing node of the SDS is assigned two of the four software-defined NUMA domains. The topology of four software-defined NUMA domains will be presented to the guest operating system.

In this example, four instances of the memory load program have been started and assigned to specific vCPUs and NUMA domains. The respective assignment order of the four instances of the memory load program is CPU 0, 6, 2, and 4.

In this example, the initial configuration prior to the start of the test, as displayed by numactl -H and numastat -m (that is, from the perspective of the guest operating system), is shown below. The below configuration shows four NUMA domains, with Table 2A indicating an assignment of vCPUs and memory to each domain. As shown below, the configuration also includes Table 2B indicating access latencies between the NUMA domains. In this example, the configuration is from the perspective of the guest operating system, which refers to a NUMA domain as a "node" (even though in this example case, the domains are software-defined, and they are not actually four physical computing nodes as perceived by the guest, but two in the software defined server).

Initial Configuration Example available: four nodes (0-3).

TABLE 2A

| | |
|---|---|
| node 0 | cpus: 0 1 |
| node 0 | size: 46131 MB |
| node 0 | free: 45001 MB |
| node 1 | cpus: 2 3 |
| node 1 | size: 46131 MB |
| node 1 | free: 45072 MB |
| node 2 | cpus: 4 5 |
| node 2 | size: 46131 MB |
| node 2 | free: 45045 MB |
| node 3 | cpus: 6 7 |
| node 3 | size: 45106 MB |
| node 3 | free: 43831 MB |

Table 2B below is a table of node distances (indicated by either 10 or 250) of memory access between the four domains (where in this example initial configuration, "node" distances refer to latencies between software-defined NUMA domains, as perceived by the guest operating system).

TABLE 2B

| Node | 0 | 1 | 2 | 3 |
|---|---|---|---|---|
| 0 | 10 | 250 | 250 | 250 |
| 1 | 250 | 10 | 250 | 250 |
| 2 | 250 | 250 | 10 | 250 |
| 3 | 250 | 250 | 250 | 10 |

In the above example, Tables 2A and 2B make up a software-defined NUMA configuration that is presented to the guest operating system, one which shows the assignment of virtual processors and guest physical addresses (which, as observed by the guest, are physical processors and physical addresses, respectively) to software-defined NUMA domains (which in this example, as observed by the guest, are nodes). The other table shows the relative virtual memory access latencies between the domains (e.g., for accessing memory in another domain).

Below are further details and visualizations of improved guest memory usage.

As described above, best efforts are made. Suppose that there is no NUMA (or, effectively, a NUMA domain of one). In this example case, suppose that there are four processes that are allocating memory, and the four processes are touching the memory—where the hyper-kernel is observing this touching of memory—and what may result, for example, is an interleaved, fragmented memory pool, as shown in the example of FIG. 11A.

Figure 11A:
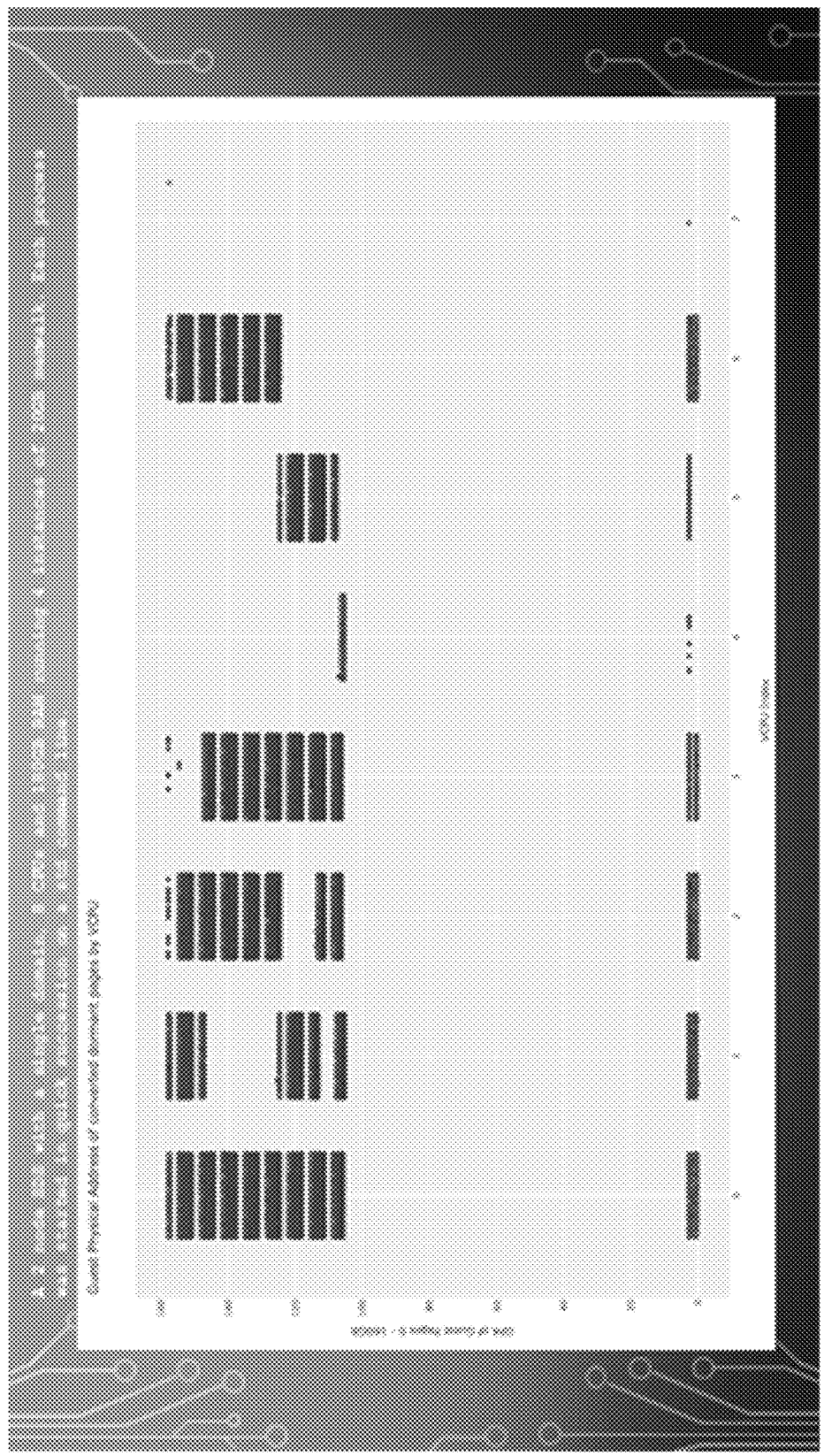
FIG. 11A illustrates an example of a two-node software-defined server.

FIG. 11A illustrates an example of a two-node software-defined server (SDS) (also referred to herein as a "Tidal-Pod") with a single domain, eight CPUs, and 180 GB RAM running four instances of 20 GB memwalk. In this example, suppose that each process was started in quick succession on a std command line.

Fragmentation can be seen in the example of FIG. 11A, where there are eight processors, and the memory from each of the four processes becomes very fragmented, the memory becomes interleaved, and the memory tends to be allocated from the high memory on down. This is an example of the way that Linux performs its memory allocation.

Figure 11B:
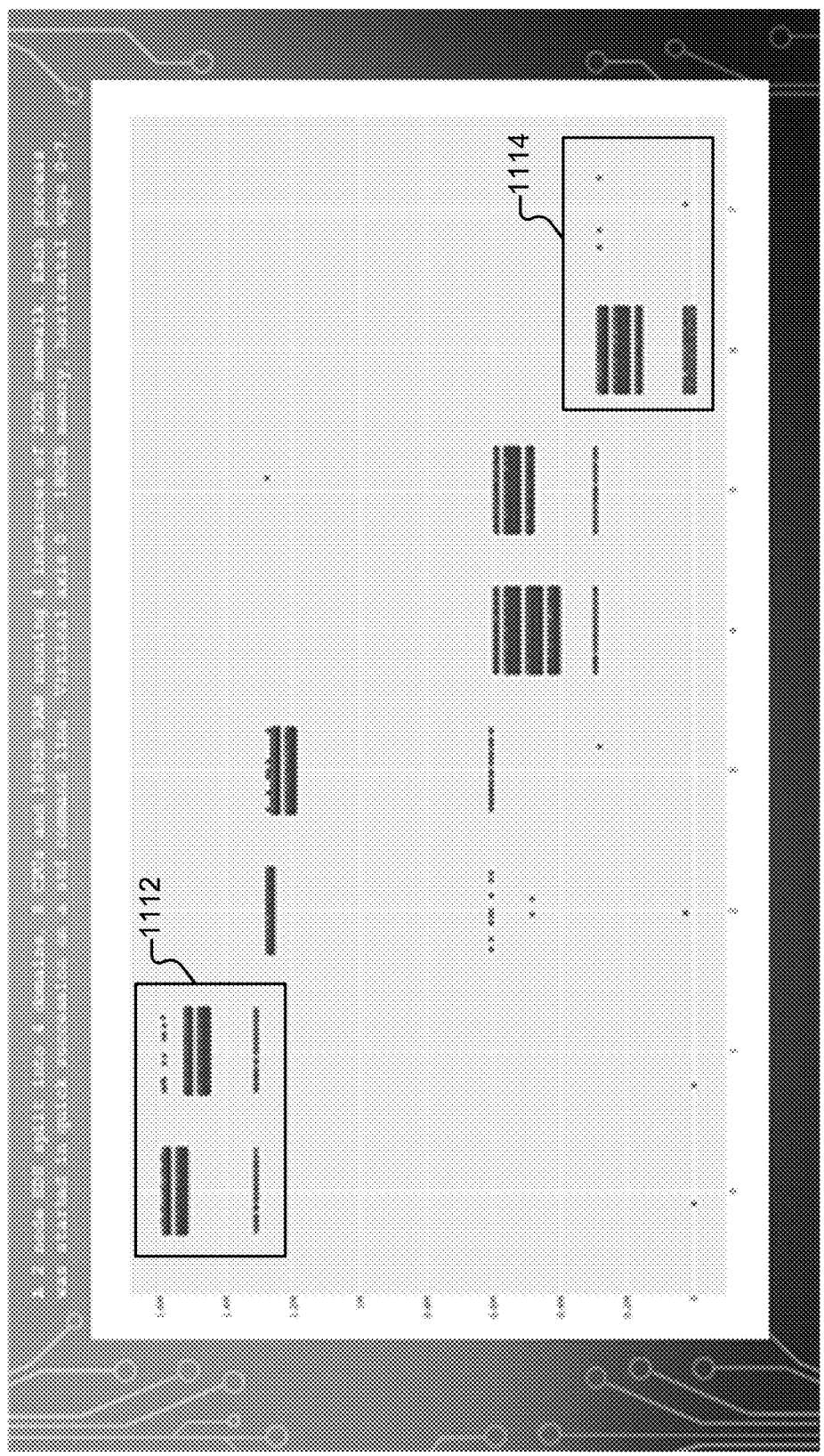
FIG. 11B illustrates a visualization of a two-node software-defined server.

FIG. 11B illustrates a visualization of a two-node SDS split into four domains, eight CPUs and 180 GB RAM running four instances of 20 GB memwalk. In this example, each process was started in quick succession on an std command line. As shown in this example, the vertical axis ranges from 0-180 GB memory, where the horizontal axis shows vCPUs 0-7 (identifiers for the eight vCPUs)

Figure 11C:
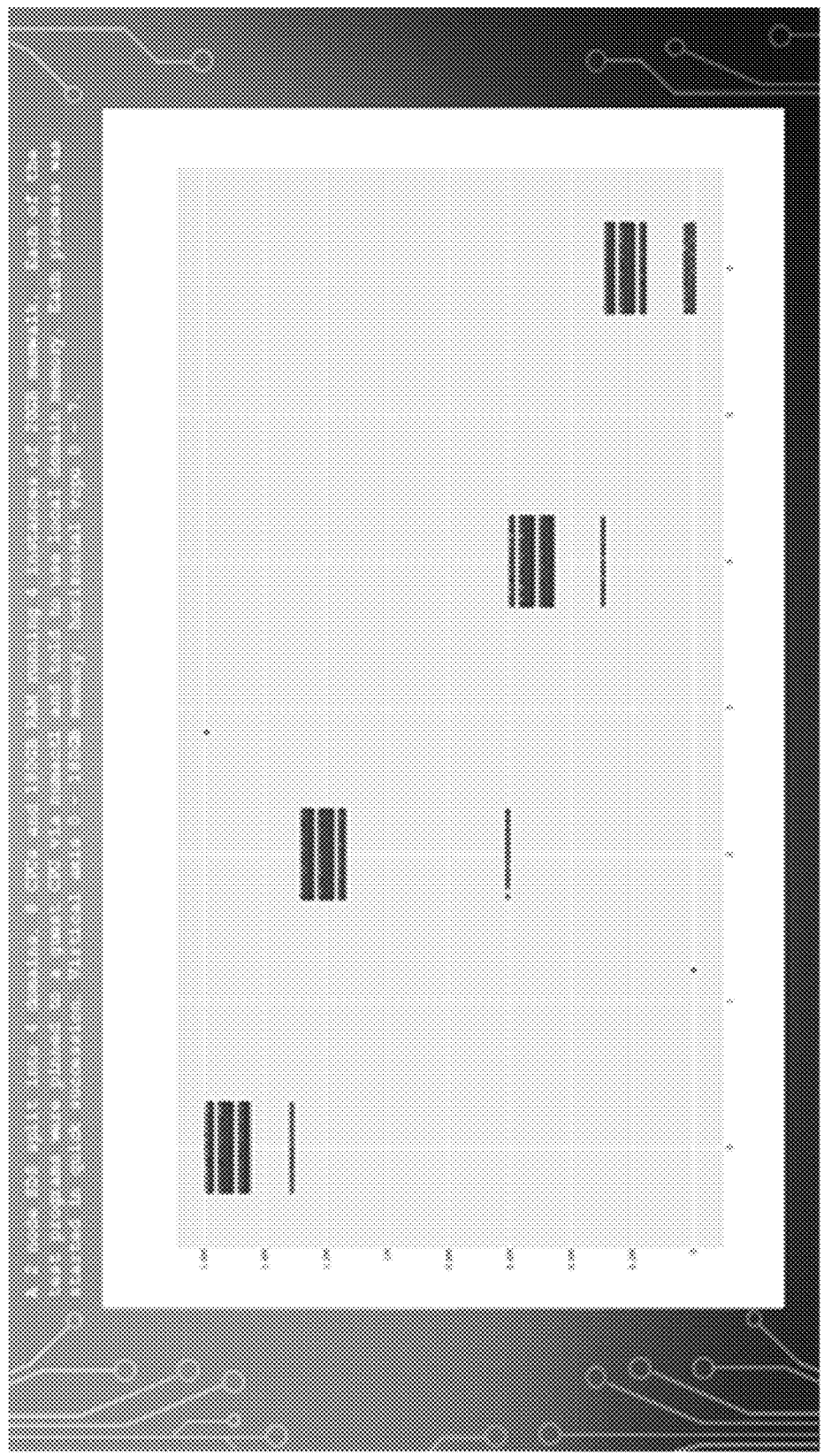
FIG. 11C illustrates an embodiment of a two-node software-defined server.

In this example shown in conjunction with FIG. 11B, NUMA was turned on (before even using NUMA control), and a virtual environment that has four NUMA domains was established (on a software-defined server that has two physical computing nodes). So, in this example, working sets are recommended that are half a node in size (each computing node has two software-defined domains). FIG. 11C may then be observed. Distinct banding can be observed here in FIG. 11B.

The example of FIG. 11B shows a virtual environment (presented to the guest operating system) having four domains, eight CPUs, and 180 gigabytes of RAM, where each process is allocated a portion of the virtualized resources. In this example, when the Linux operating system (guest OS) attempts to allocate the guest physical addresses (or "GPAs," which refer to what the guest operating system believes to be physical addresses for pages of memory—that is, a guest physical address is a physical address as seen by the guest operating system) for that virtual memory, the guest operating system does so according to the software-defined NUMA domains.

The example of FIG. 11B illustrates an example showing the beginnings of converting dormant pages to memory (where dormant pages are those pages that have not yet been written to—in some embodiments, if a page is dormant, it has no physical backing page, so it takes no physical space).

What is shown in this example is that there are four processes, and the Linux guest has been told to use NUMA, but the guest application (running on the Linux guest OS) has not been told to use NUMA yet. In this example case, when the first process allocates a fifth of the memory, the guest operating maps that virtual memory onto guest physical addresses that are in a separate NUMA domain than the other three processes.

In this example, there are four domains (four software-defined NUMA domains defined by the hyper-kernels and presented to the guest operating system), and the eight VCPUs (which the guest believes to be actual physical processors) are divided evenly among the four domains (two vCPUs per software-defined NUMA domain). For example, vCPUs 0 and 1 are mapped to the top NUMA domain (1112). The example of FIG. 11B shows memory portions of the (software-defined) NUMA domains. As shown in this example, when the guest allocates memory for CPU seven, it will do so in the bottom domain (1114).

Thus, as shown in the example of FIG. 11B, by establishing software-defined NUMA domains and presenting them to the guest operating system (without enabling or using NUMA control (numactl) for a NUMA-aware application), the guest operating system pays attention to the NUMA domain configuration (and, for example, allocates (virtual) processors and (guest) physical addresses accordingly).

Now afterward, in the example of FIG. 11C, suppose that NUMA control is being used to tell a NUMA-aware application what to do.

FIG. 11C illustrates an embodiment of a two-node SDS or TidalPod split into four domains, eight CPUs and 180 GB RAM running four instances of 20 GB memwalk (guest application in this example). In this example, each of the test programs was pinned to a guest CPU (vCPU) via numactl and told to use local domain memory. Each process was started in quick succession in this example. Here, the vertical axis shows 0-180 GB memory, and the horizontal shows vCPUs 0-7.

Now, as shown in the example of FIG. 11C, clear banding may be observed. This is because, in this example, it has been indicated that a process is desired in a specific NUMA domain. The guest operating system is making a best effort to tie the CPU to the NUMA domain.

While FIG. 11C illustrates an example of banding and grouping of vCPUs and GPAs, this is virtual (as it is a virtual environment defined by the hyper-kernels and presented to the guest operating system), and any correlation between what is provided to the guest and what the actual hardware does has been completely separated/broken. Here, in the case of a software-defined server, the physical realization of memory and physical processors need not match what is shown in the visualization (which is the allocation of virtualized resources from the perspective of the guest operating system given the software-defined NUMA topology provided to the guest).

However, various embodiments of a software-defined server include a map of vCPUs to memory. Such maps may be used to make a decision on whether or not to move the vCPU or to move the memory (e.g., when a stall occurs and the core or hyperthread instantiating the vCPU cannot access the needed portion of memory). It can be determined, for example, whether the vCPU is in domain, out of domain, or far out of domain (where relative distance may be defined using a domain latency table such as described above). Similarly, for memory, in some embodiments, it is determined whether the memory is in domain, out of domain, or far out of domain. It can be determined, for example, that a vCPU is with memory in domain (indicating that they are on the same node, where in this example domains are subdivided to a super set of nodes, and there are one or more domains per node). The determination of where the virtualized resources are relative to a domain (and computing node) may be used as factors that are considered when handling a stall and determining how to migrate/locate resources.

Whereas, without a software-defined NUMA configuration indicating an assignment of GPAs and vCPUs to NUMA domains, working sets may attempt to co-locate the virtual processor and memory together; now, with software-defined NUMA domains configured, hyper-kernels, when creating working sets, will receive a very strong hint from the software-defined NUMA as to how to co-locate them. So, for example, if it is observed that a vCPU is out of domain and the memory is in domain, the hyper-kernel may be biased towards migrating the vCPU to the memory (so that both are on the same domain). That is, the virtual resources need to be, or should be, on the same node that owns the domain. As will be described in further detail below, the software-defined NUMA configuration may be taken into account by the hyper-kernel when determining how to perform resource migration (e.g., when a stall occurs).

In another example scenario, if the vCPU is in domain and the memory is not, the hyper-kernel may request the page (to bring the page in domain, by having it migrated to the node that owns the domain, which the vCPU is already on).

The vCPU being in-domain indicates that more memory that it wants is in-domain as well. So an assumption may be that vCPUs and memory are to be kept in domain.

If both the vCPU and the memory are not in domain, then in some embodiments, the hyper-kernel has to make a decision on what to do next. In some embodiments, using the knowledge of the location of virtualized resources relative to software-defined NUMA domains, the hyper-kernel determines the cost (e.g., how expensive it is) to move the page or move the vCPU. The hyper-kernel then makes a decision of where resources are going to be moved to.

For example, if it is determined that the vCPU is not in domain and the memory is not in domain, it may be decided to move the vCPU to its domain and let it pull (e.g., request) the page to its domain next. This may be performed in anticipation that such an action will provide optimal future performance (in, for example, five instructions), where providing optimal future performance includes preventing a stall that is likely to occur (i.e., by pre-emptively migrating the page in advance).

In some embodiments, an estimate is made of the optimal way to compute the working sets (e.g., by observing history of accesses of pages by threads). Here, using the software-defined NUMA techniques described herein, another piece of information (mapping of virtualized resources to domains and the relative latencies of accesses) may be used (independently or in conjunction with the observed history of accesses of pages by threads) to make resource migration decisions. As described above, the software-defined NUMA topology may be set up by a user, and provides to the hyper-kernel a very strong indicator that this is what the programmer or the operator would like to do (where the programmer can define their desired software-defined NUMA topology/configuration), and the hyper-kernel described herein is able to support the desire of the programmer (e.g., by locating virtualized resources on physical computing nodes in a way that aligns (even if not exactly) with the software-defined NUMA topology).

In some embodiments, this is a very fast mapping, which is beneficial, because the guest is assisting the hyper-kernel by indicating that a certain CPU running a certain process belongs to a certain domain. This mapping, which is referred to herein as a "software-defined NUMA domain," is a form of a virtual or software-defined working set. The software-defined NUMA domain is virtual because it does not map to any hardware, but rather, is a mapping to a conceptual system in the hyper-kernel. However, the hyper-kernel may use this as further information to determine how virtual resources are to be mapped to physical resources.

Given awareness of a desired software-defined NUMA topology, and maintaining mappings between this, other functionality may also be supported, such as the ability to move ownership of NUMA domains (where as described above, nodes own domains). That is, the mapping of NUMA domains to physical computing nodes of the TidalPod may be changed.

Figure 12:
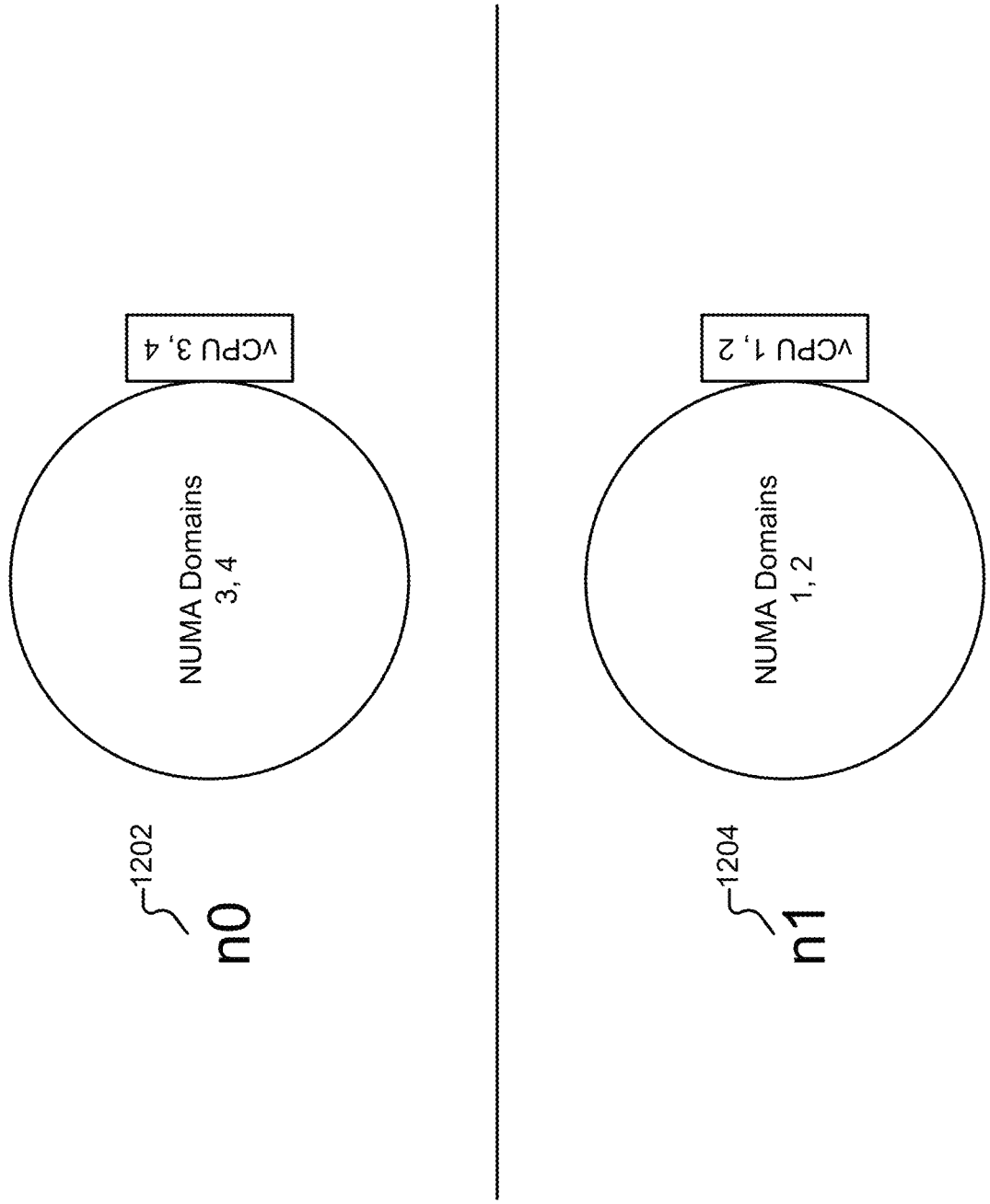
FIG. 12 illustrates an embodiment of a software-defined server and software-defined NUMA domains.

Consider the example illustrated in FIG. 12. FIG. 12 illustrates an embodiment of a software-defined server and software-defined NUMA domains. Suppose that there are physical computing nodes zero ("n0") (1202) and one ("n1") (1204), and these each have or "own" two software-defined NUMA domains, where in this example, counting is started from one. As shown in this example, physical node 0 ("n0") has (software-defined) NUMA domains three and four, and node 1 ("n1") has (software-defined) NUMA domains one and two. In this example, as shown, suppose that there are four vCPUs, 1, 2, 3, and 4. vCPUs 1 and 2 are assigned to domains on node n1, and vCPUs 3 and 4 are assigned to domains on node n0. In some embodiments, the hyper-kernels maintain a mapping of software-defined NUMA domains to computing nodes, as well as a mapping of virtualized resources to software-defined NUMA domains. The hyper-kernels may also maintain a mapping of virtualized resources to computing nodes.

Now, suppose that it is observed that node zero is starting to get full (e.g., it is running out of memory). In this example, the hyper-kernel is able to decide, based on various heuristics, that it is desired to move domain four to be owned by node one. In some embodiments, migrating a NUMA domain to another node causes the CPUs or the threads (that are currently implementing the vCPUs) that are actually accessing the memory in that domain to move to node one. Thus, memory layout and CPU layout (or at least thread layout) can be optimized preemptively. In one embodiment, this is looked at in terms of when trying to push memory off of a node, because it has become full. For example, the domain may be pushed to the next node.

In some embodiments, where these guest physical addresses (GPAs) belong in terms of which node owns the domains is also evaluated. Then, in some embodiments, the GPAs are pushed to those nodes. So, in this example, an attempt is made to preemptively enforce a mapping that currently exists (e.g., the mapping between GPAs and domains, where the mapping is enforced, for example, by moving the GPA to a computing node that now owns the software-defined NUMA domain to which the GPA is assigned). That mapping may change later, but a mapping that exists at the time is enforced. That allows preemptive movement and a consistent environment to be maintained across all nodes, rather than being out of memory in one node, or oversubscribing CPUs, etc.

In the above examples of memory latency tables, the table included 10 s and 250 s for in-domain/out-of-domain accesses. Typically, in observed behavior, this may normally be 10 and 20. In some operating systems, such as Linux, if the latency is below a value such as 30, Linux does not pay attention to it. For example, Linux accepts that there are some variables that it is unable to control, and it simply accepts the latency issue associated with such variables. Most commonly, this is associated with time, with, for example, what is called the jiffies variable, which is running at approximately on the order of a millisecond (e.g., updates approximately every millisecond). It is accessed (e.g., written to) by one CPU at a time, but that CPU can change over a longer period of time, and it is read by all other CPUs.

The jiffies variable is one example of a variable where Linux accepts the latency issue. This may prevent or inhibit optimization of minimizing latencies. With respect to such variables, the cross-domain memory access latencies described above become relative noise in decision making, compared to how often that one variable has to be moved back and forth (which is one that Linux ignores and does not attempt to control).

In some embodiments, one solution to address such variables (which are in a page of memory that is highly contended because it is accessed by a large number of vCPUs, which may be on various domains on different computing nodes) is to flock the vCPUs—that is, bringing all of the vCPUs together to a single node, where the variable (or the memory that holds the variable) is in one place.

In this example case, the number of decisions made around that type of variable may be the majority of the signal coming out of resource migration decision algorithms. In this case, while software-defined NUMA domains may be evaluated in the decision-making process, it may be indistinguishable from other large signals such as the jiffies variable, which may be the dominant factor in determining migration behavior/decisions (as compared to other considerations such as software-defined NUMA domains, which may be used as factors in cost functions, such as those described herein to make resource migration decisions).

As shown in the above, as well as the below examples and embodiments, once the mapping between the virtual layer and physical layer is broken, for example, from what is happening on the physical motherboard(s) or computing nodes, it allows the hyper-kernel to be very instruction efficient on its decisions.

While the optimal characteristics of working sets may be discovered (e.g., by observing thread accesses of pages of memory), using the techniques described herein, users (e.g., database administrators) can provide information about what the optimal characteristics for working sets (e.g., via mapping of certain vCPUs and GPAs to certain NUMA domains) are/should be. The hyper-kernel will then take this desired topology into account when determining how to map virtualized resources to physical resources (and locate the virtualized resources on actual computing nodes). This is helpful for database administrators, who may wish to have control on memory access (e.g., to hard drives, physical memory, etc.).

In some embodiments, administrators may be allowed to configure information about how they would like NUMA domains to be used, where this configuration is then provided to the guest operating system. An example of a specification of a software-defined NUMA topology to be presented to a guest running on a software-defined server is provided below.

In some embodiments, this is a two-step process. The first step is that the user indicates to the configurator of the software-defined server (or the operator of the software-defined server) information pertaining to how they want the application to run (e.g., how many NUMA domains there are to be, and how many processors and memory there are to be in each domain). In some embodiments, the guest operating system is then told of the desired NUMA configuration through a mechanism such as ACPI tables (e.g., resource-to-domain assignment table and cross-domain memory virtual access latency table, collectively referred to herein as the "software-defined NUMA domain tables"). That is, for example, a person (e.g., database administrator (DBA)) describes or specifies how they would like to configure the system (e.g., the customer is asked how they would like to configure the virtual topology—e.g., as software-defined/virtual NUMA domains). Then that information is built into the virtual/software-defined NUMA domain tables (virtual resource-to-domain assignment table and intra/inter-domain memory access latency table), and that is given to the guest operating system. The guest operating system (by being provided the software-defined NUMA domain tables) is then in agreement with what the customer says.

As shown in this example, the tables are effectively preconceived when the software defined server is booted. The tables are configurable. For example, there is a configuration file that can be dynamically changed. For example, the DBA can indicate that their NUMA domain configuration is incorrect for the application they are running. Using the techniques described herein, the DBA may then define a new software-defined NUMA topology, where the system, even if running on the same actual hardware (e.g., some set of physically interconnected computing nodes forming a TidalPod), may then be rebooted with a new, different, software-defined NUMA configuration prior to the application running. This is not possible in existing systems, where the NUMA domains are tied to the actual physical hardware that is running, and NUMA topologies cannot be changed without changing the physical hardware. In contrast, using the software-defined NUMA techniques described herein on a software-defined server, NUMA topologies provided to the guest can be changed without requiring changing of the underlying physical hardware.

As will be described in further detail below, the preconfigured software-defined NUMA domain tables are then used as hints by the guest system and the hyper-kernel to optimize for memory access latency when the system is running.

As described above, having a dynamically configurable software-defined NUMA topology that is presented to a guest operating system is different from typical NUMA implementations. For example, actual NUMA depends on the number of sockets there are on a motherboard. Once that motherboard is decided on, the NUMA topology is fixed and cannot be changed (because the physical structure of the motherboard is set). The application is not reconfigurable unless the motherboard is physically changed. In contrast, using the techniques described herein, for the same underlying physical hardware, different software-defined NUMA topologies can be presented to a guest operating system (for example, different virtual motherboards with different numbers of sockets may be presented, without having to change the actual underlying physical hardware).

The following example is an embodiment of providing the software-defined NUMA topology to a guest operating system.

First, there is a machine.def file which indicates that there is a number of processors and memory. In some embodiments, each interconnected computing node in the cluster forming the TidalPod has a machine.def file, and this may be considered as an adjunct to that.

A user (e.g., DBA) can specify the number of (software-defined) NUMA domains they would like (to be presented as part of the virtual environment). For example, the user can set, via a configuration interface, the number of desired NUMA domains to four, in which case a virtual environment with a software-defined NUMA topology with four NUMA domains is presented to the guest. If they set that variable to eight, there are eight NUMA domains. If they set that variable to 16, there are 16 NUMA domains.

The DBA may decide on the number of NUMA domains based on various considerations. For example, if the DBA has a situation where they know that their database is very good at having very constrained data, then having a higher number of NUMA domains may make sense because it gives a smaller working set that can be quickly shifted back and forth.

Thus, via configuration, the DBA is able to tune the number (and in some embodiments, the topology) of the NUMA domains for their application. Further, the DBA can dynamically change the software-defined NUMA topology and reboot the software-defined server with a new software-defined topology, without having to change the actual physical underlying hardware.

When the guest operating system reads the information about the software-defined NUMA domains, the guest operating system pulls the software-defined NUMA configuration out of memory—for example, the guest operating system accesses what it believes to be hardware (e.g., BIOS) memory that is actually provided by the hyper-kernels (which provide the virtual/emulated BIOS for the virtual environment). For example, before the guest is running, the BIOS is written so that by the time the guest boots, the system is set up so the guest will go to information that the hyper-kernel has provided in a memory space that the guest OS believes to be BIOS memory.

The software-defined NUMA topology configuration may be performed prior to booting the guest. For example, the software-defined NUMA topology may be specified in a configuration interface, also referred to herein as "waverunner" (which is described in further detail below). This tool allows the DBA to configure the virtual motherboard (of the virtual machine presented to the guest operating system) to have certain NUMA characteristics (where the BIOS contents may be written according to a set of constraints).

When the guest operating system boots, it reads BIOS memory, whose contents are controlled at least in part by the software-defined NUMA topology configuration.

Thus, for the same identical hardware, different virtual motherboards (with different software-defined NUMA domain topologies) may be configured (subject to constraints). The following are two examples. Suppose, for example, that the DBA has a database that is processing Internet of Things (IoT) data, which may involve numerous amounts of small pieces of data that could be correlated in many, many different ways. This would result in a very large working set because the memory will be accessed in a random fashion. This scenario would typically require a lower number of NUMA domains, because there is not a clear way to properly segment that database.

In contrast, suppose that the DBA has a database which is a market analysis for a large retailer. Such data tends to be geographically-constrained. For example, the data may be constrained by state. In that case, the working sets of data that may be processed are potentially much smaller. In this case, a DBA may wish to define a larger number of NUMA domains (where each domain, for example, maps to some set of geographic regions). That is, the number of software-defined NUMA domains may be determined based on the ability to segment the data in a clean way, and based on how much of an interaction there is.

Consider, as another application, simulations. For example, take traffic simulations in, for example, the Boston area. In this example case, there may be numerous pieces of data that are moving all over a large simulation domain. In this case, constraining the data in terms of NUMA domains may not work as well as, for example, a fluid simulation, which can be constrained into smaller blocks, which only interact on the edges. In the fluid simulation case, a high number of NUMA domains may make sense to allow for data in the middle to be constrained together, where the problems on the edges are accepted.

In the traffic simulation scenario, if data were to be bounded by region (which translates or maps to a NUMA domain), a car may move from one place to another, and so it may cross the boundaries more often. Whereas, for fluid simulations, unless performing particalized simulations, a fluid simulation is dealing with changes in pressure, velocity, and density.

In the above, a DBA may wish to have different types of NUMA topologies for different types of scenarios. As described above, in existing systems, the DBA would need different hardware systems for each of the different topologies that are desired for the different applications. However, using the software-defined NUMA topology techniques described herein, the DBA can define different virtual/software-defined NUMA configurations for their different applications, and simply reboot the same hardware (Tidal-Pod) with a different software-defined NUMA configuration each time they wish to run a different application.

The following is an example of performing a software-defined NUMA configuration for a software-defined server.

In this example, suppose that there are two customers, customer 1 (cust 1) and customer 2 (cust 2).

In this example, suppose that both customers happen to have the same identical physical hardware implementation/configuration, that is, four physical computing nodes in their TidalPod.

However, while the two customers happen to have identical underlying physical hardware, suppose that they have different database applications that they are going to run, and therefore, different desired NUMA topologies.

Table 3 below illustrates an embodiment of a set of configuration parameters for the software defined servers of each of the customers.

TABLE 3

| Configuration | Customer 1 | Customer 2 |
|---|---|---|
| wr prod.addnode | 4 | 4 |
| wr set cpus | 64 | 64 |
| wr set memory | 4 TB | 4 TB |
| wr set NUMA | 4 NUMA Domains (16 CPUs, 1 TB per domain) | 8 NUMA Domains (8 CPUs, 512 GB per domain) |

In one embodiment, the customers configure their software-defined servers via a configuration interface that is also referred to herein as "waverunner" ("wr" in the example of Table 3).

As shown in this example, customers 1 and 2 have chosen the same underlying hardware implementation, with the same number of physical computing nodes (4) (specified via "Pod.addnode"), the same number of aggregate (v)CPUs (64), and the same amount of aggregate memory (64 TB). However, customers 1 and 2 differ on the number of software-defined NUMA domains they would like in their software-defined NUMA topology. As described above, this may be due to the nature of the applications they wish to run.

In this example, suppose that customer 1 has selected four software-defined NUMA domains for their software-defined server because they are running four instances of a database, and that customer two has selected eight software-defined NUMA domains for their software-defined server because they are running eight instances of a database. For example, suppose that the customers are in retail operations. Customer 1 has four departments, where each department has a database. Customer 2 has eight departments, where each department also has its own database.

In this example, NUMA domains are being allocated per database instance. So in this case, for customer 1, by dividing the processors and memory equally among the specified number of domains, customer 1 will have 16 vCPUs per domain and 1 terabyte per domain in their software-defined server (virtual server that is presented to the guest operating system). In contrast, customer 2, according to their specification, will have eight CPUs per domain and half a terabyte of memory per domain.

This example illustrates the flexibility of the techniques described herein, where despite the different customers happening to have the same physical configuration, they are able to define different software-defined NUMA topologies to be presented to the guest operating system in order to optimize memory latencies given their respective application needs.

To extend this example, suppose that customer 1 and customer 2 are the same customer, and that they have different problem sets during the day versus night. Further, suppose that on Monday, Wednesday, and Friday the customer is focused on analytics for one set of stores, and on Tuesday, Thursday, Saturday, is focused on another set of stores. That is, there is a temporal aspect to what applications are being run, where there may be different NUMA requirements given the different applications being run at different times.

In this example, for the day/night temporal changes scenario, suppose that the DBA of the customer may determine that their application will work better with eight NUMA domains in this scenario at night. This may be because of the type of data that's being read. This is versus the daytime, where four NUMA domains would work better on the same hardware configuration (e.g., the customer is doing retail analytics during the day, and stocking/inventory at night). Using the techniques described herein, in order to change the number of NUMA domains for the different data sets, the DBA simply shuts the machine down, switches software-defined NUMA configurations, and the system is booted back up (e.g., rebooted), allowing for a more optimal scenario for the application being run.

In this example, despite there being multiple applications to be run with different optimal NUMA topologies, the customer did not need to buy different hardware with different hardware topologies for the different applications (in order to support specific physical NUMA topologies). Rather, they are able to leverage the same hardware, and simply specify different software-defined NUMA configurations for whatever application they wish to run.

Various processing is performed based on the specified software-defined NUMA configuration. For example, when a cluster of hardware (also referred to herein as a "pod" or "TidalPod") is specified, four pieces of actual hardware nodes are added to the pod, where the pod owns those nodes. The number of vCPUs, amount of guest physical memory, and the number of software-defined NUMA domains in the configuration are environment variables or variables that are set. The pod is associated with its own database of configuration data, which includes memory size, CPUs, and NUMA domains/nodes. With respect to the database of pod configuration data, in some embodiments, when the system is booted, a machine.def file is built, which is the definition of the pod, subdivided into per node information. The machine.def file allows for, when the system boots up and when the guest operating system is starting, a definition of what the virtual machine/server looks like (to the guest operating system). In some embodiments, for the software-defined NUMA domains, when the pod is being started, but before the guest environment is entered into, the number of software-defined NUMA domains is evaluated. Memory and CPUs are separated out to fit those NUMA domains and build software-defined NUMA domain or topology tables, such as the virtualized resource-to-NUMA domain mapping table, and domain virtual access distance (latency) ACPI tables (examples of which are described throughout). In some embodiments, each node has copies of the software-defined NUMA topology tables.

In the above example domain latency table of Table 1, there were only two values, indicating binary levels for relative virtual access time—that is, there is the in-domain latency, or the out-of-domain latency (for accessing data in another domain). As will be described in further detail below, in various embodiments, there may be other latency levels/distances as appropriate.

The example of Table 1 is reproduced here for illustrative purposes, which may be used as an example of the memory latency table generated for customer 1, which has specified four NUMA domains, as described above.

TABLE 1

| 10  | 250 | 250 | 250 |
|-----|-----|-----|-----|
| 250 | 10  | 250 | 250 |
| 250 | 250 | 10  | 250 |
| 250 | 250 | 250 | 10  |

In some embodiments, the number of relative latency levels may be configured based on the underlying physical hardware (e.g., how the domains are mapped to the computing nodes). For example, customer 1 has four software-defined NUMA domains, and four physical computing nodes in their TidalPod. In this example, suppose that each computing node owns one of the software-defined NUMA domains. Here, in this example, the in-domain access latency of "10" maps to the latency involved with local memory access within a node, while the relatively larger "250" latency corresponds to the latency involved with having to access memory on another node (or otherwise out-of-domain).

One example way of choosing the latency values is based on a multiplier in terms of latency. For example, for a standard motherboard, units or values of 10 and 20, or 10 and 30, may be used, which indicate that to go access memory from one socket to a different socket's memory could take twice as long or three times as long. In some embodiments, the min/max allowable values in the table are set (e.g., by a motherboard manufacturer, where the tables are typically built into the ROM of the BIOS chip).

In the example of Table 1, suppose that the motherboard manufacturer has set a maximum allowable latency value of 250. In the example of Table 1, the value of 250 was chosen because in observing the memory latency from socket to socket versus the memory latency that is observed between node to node, that ratio is much beyond 250, and thus the maximum value was chosen.

Any value may be used to populate the table as appropriate. However, in some embodiments, to observe the different possible latencies, the latencies are defined relative to each other. For example, access to another domain that is on the same node may be defined to be five times longer than access within the same domain, and accesses to domains on a different node are 10 times longer. Encoding relative virtual access latencies in the tables described herein allows for scaling as processors and memory become faster (with increasingly faster access times). For example, latencies are used to define distances, where accesses may be close (e.g., local within the domain), medium distances, far, etc. The different relative latencies reflect the different distances in hardware that memory resides if accessed. For example, the relative latencies may map to the various levels of a memory hierarchy (e.g., processor caches, DRAM, network storage, etc.).

Table 4 below illustrates an embodiment of a memory latency table with three relative virtual latency levels, encoded in this example as 10, 25, and 250.

TABLE 4

| Domain | 0   | 1   | 2   | 3   |
|--------|-----|-----|-----|-----|
| 0      | 10  | 25  | 250 | 250 |
| 1      | 25  | 10  | 250 | 250 |
| 2      | 250 | 250 | 10  | 25  |
| 3      | 250 | 250 | 25  | 10  |

Table 4 illustrates latencies between four domains. Suppose that in the underlying physical hardware, there are two physically interconnected computing nodes in the pod, with two domains per node. In this example, suppose that each computing node has a dual socket motherboard, where for the two domains on a computing node, each domain is mapped to a socket. In this example, there are domains 0, 1, 2, and 3. In this example, domains 0 and 1 are grouped in the same domain group on node 1, and domains 2 and 3 are grouped in the same domain group on node 0.

In this example, the rows and columns correspond to domains. A cell indicates the latency for the domain of the row to access the domain of the column (or vice versa).

For example, the diagonal values indicate the latency for one domain to access memory in its own domain, and is the minimum unit of 10. Accessing memory between domain 0 and domain 1, which are on the same node, within the same domain group, but different domains (and e.g., different sockets on the same motherboard, where each node has a motherboard), is a middle latency of 25. However, accessing memory between domains on different nodes (e.g., between domain 0 and domain 2) has the longest latency of 250. In this example, the accesses latencies that may be experienced across the underlying hardware have been encoded in a table that indicates to the guest operating system that it is running on a virtual motherboard with characteristics that result in three levels of memory latency (where the virtual motherboard does not necessarily match the underlying physical hardware, but that from the guest perspective, the virtual motherboard has three levels of memory latency). The guest operating system will use the different levels of values when determining how best to run an application to optimize latencies. As shown in this example, the relative domain access latencies and the number of levels are dependent on the number of software-defined NUMA domains desired, as well as how they are mapped among the actual hardware of the TidalPod (e.g., to sockets, motherboards, computing nodes, etc.).

In some embodiments, these software-defined NUMA topologies are placed on each node in the pod.

In some embodiments, the domain groupings are specified in a separate table, but may also be encoded in the latency table.

In some embodiments, the software-defined NUMA configuration topology tables are built from the information in the machine.def file that defines the virtual machine on which the guest operating system believes it is running.

As described above, the generated tables may be placed in a portion of memory that emulates memory of a typical BIOS chip (e.g., ACPI on static memory of the BIOS chip). In some embodiments, the BIOS chip, with the tables, is emulated so that the guest operating system reads that portion of memory as if it were on a BIOS chip (the guest OS believes it is reading from an actual BIOS chip). When changing software-defined NUMA configurations, the tables are simply changed on a boot-to-boot basis.

The system may also maintain a mapping of software-defined NUMA domains to nodes. However, as described above, and will be described in further detail below, domains need not be permanently assigned to a node, and may instead be migrated or moved to other nodes.

The mapping of NUMA domains to nodes is, in some embodiments, used by the hyper-kernels, for example, when handling stalls, as will be described in further detail below.

The various software-defined NUMA topology tables described above may be replicated in the machine.def file that is placed on each computing node.

In this example, the latency table of Table 4 is replicated on every one of the computing nodes, and indicates that the database administrator is defining four NUMA domains, zero through three. The latency table indicates to the guest OS what the complete, fully connected latencies are amongst those four domains.

In some embodiments, the latency table, along with the virtualized resource-to-software-defined NUMA domain mapping table, are seen and used by the guest operating system and/or guest application running on the guest operating system to optimize memory latencies, which are also used as hints or goals to the hyper-kernels when determining the best or optimal way to migrate resources or map virtual resources to physical resources (e.g., in response to stalling events). (This does not necessarily mean that the hyper-kernel will arrange virtualized resources in the same way as perceived by the guest operating system, as there may be other factors under consideration when determining where to place vCPUs and GPAs)

In some embodiments, the virtualized resource-to-NUMA domain table that is seen by the guest indicates how much memory is in this domain. It also includes the starting address of that memory. It also includes an assignment of vCPUs (where vCPUs may have a processor identifier) to domains. In some embodiments, these are provided to the guest. Thus, in some embodiments, the software-defined NUMA configuration tables accessed by the guest environment include a software-defined NUMA latency table, as well as a table indicating a mapping of virtualized resources to domains.

Examples of software-defined NUMA topology tables (as observed from the perspective of the guest) are provided below for reference (where the word "node" refers to the NUMA domain, where the guest treats each domain as a "node"—for example when NUMACTL is run, it uses the word "node" to refer to a NUMA domain). These example tables are what are presented to a guest environment, from the guest environment's perspective.

Table 5A illustrates an embodiment of assignment of virtual processors and memory to software-defined NUMA domains. From the perspective of the guest operating system, this is an assignment of physical processors and memory to NUMA domains.

TABLE 5A

| available: four nodes (0-3) | |
|---|---|
| node 0 | cpus: 0 1 |
| node 0 | size: 46131 MB |
| node 0 | free: 45001 MB |
| node 1 | cpus: 2 3 |
| node 1 | size: 46131 MB |
| node 1 | free: 45072 MB |
| node 2 | cpus: 4 5 |
| node 2 | size: 46131 MB |
| node 2 | free: 45045 MB |
| node 3 | cpus: 6 7 |
| node 3 | size: 45106 MB |
| node 3 | free: 43831 MB |

Table 5B below illustrates an embodiment of a memory latency table with two relative virtual latency levels, encoded as 10 and 250.

TABLE 5B

| Domain | 0 | 1 | 2 | 3 |
|---|---|---|---|---|
| 0 | 10 | 250 | 250 | 250 |
| 1 | 250 | 10 | 250 | 250 |
| 2 | 250 | 250 | 10 | 250 |
| 3 | 250 | 250 | 250 | 10 |

Thus, based on the software-defined NUMA topology tables, from the point of view of the guest, the guest is running on a virtual machine/motherboard that has a certain number of domains. The virtual machine has a certain number of memory banks. They have a starting address. They have an ending address. They have a certain number of processors. This is from the standpoint of the guest.

The software-defined NUMA topology and the assignment of virtual processors and guest pages of memory to software-defined NUMA domains need not be reflected in how the hyper-kernel actually locates those CPUs and those pages, but may be used as a goal to direct performance optimization. For example, domains may be moved to any node that is desired.

As an illustrative exercise, suppose that the same view by the guest is constructed of six domains, where in this example, there are two levels of latency—either in domain access, or out of domain memory access. Table 6 below illustrates an example of such an embodiment with six virtual NUMA domains.

TABLE 6

| Domain | 0 | 1 | 2 | 3 | 4 | 5 |
|---|---|---|---|---|---|---|
| 0 | 10 | 250 | 250 | 250 | 250 | 250 |
| 1 | 250 | 10 | 250 | 250 | 250 | 250 |
| 2 | 250 | 250 | 10 | 250 | 250 | 250 |
| 3 | 250 | 250 | 250 | 10 | 250 | 250 |
| 4 | 250 | 250 | 250 | 250 | 10 | 250 |
| 5 | 250 | 250 | 250 | 250 | 250 | 10 |

In this example, relative to the example of Table 5B, two more columns and two more rows are added, where the diagonals are still 10 (in-domain memory access, and every other value is 250 for out-of-domain memory access). The processors and memory requested for the pod would be divided across the six domains (e.g., evenly distributed, according to guest physical address and vCPU identifier).

In some embodiments, when a stall occurs, the hyper-kernel evaluates cost functions to determine whether to migrate a vCPU and/or migrate the needed page of memory. Using the techniques described herein, the hyper-kernel instantaneously knows which computing node owns a domain now. In some embodiments, when the hyper-kernel goes through the cost functions, the hyper-kernel, using the software-defined NUMA topology configuration as a hint/goal, attempts to ensure that the CPU and the page are aligned on the node that owns that domain.

That is, the cost functions attempt to keep working sets (vCPUs and GPAs) in-domain. In some embodiments, wherever the domain is, the hyper-kernel tries to keep them in-domain (based, for example, on knowledge of the software-defined NUMA topology specified by a user of the software-defined server).

Above examples with binary values for latency were flat, where memory access is either in-domain or out-of-domain. In some embodiments, domains can be grouped together to allow, for example, more than two levels of latency, as described above.

For example, as described in conjunction with the example of Table 4, rather than only two levels for either in or out of a domain, domain groups can be added to have additional levels of virtual memory access (and virtual working set management), such as in domain, out of domain, in domain group, out of domain group. The use of domain groups allows for organization of domains (and may be used to determine varying levels of access latencies). For example, accessing memory in another domain that is in the same domain group would have its own associated cost in the latency table.

Consider, for example, the embodiment illustrated in Table 7A below, which in some embodiments is a modified version of the table in Table 6. Table 7B below illustrates an embodiment of a mapping of domains to domain groups.

TABLE 7A

| Domain | 0 | 1 | 2 | 3 | 4 | 5 |
|---|---|---|---|---|---|---|
| 0 | 10 | 25 | 250 | 250 | 250 | 250 |
| 1 | 25 | 10 | 250 | 250 | 250 | 250 |
| 2 | 250 | 250 | 10 | 25 | 250 | 250 |
| 3 | 250 | 250 | 25 | 10 | 250 | 250 |
| 4 | 250 | 250 | 250 | 250 | 10 | 25 |
| 5 | 250 | 250 | 250 | 250 | 25 | 10 |

TABLE 7B

| Domain Group | Domains |
|---|---|
| 0 | 0, 1 |
| 1 | 2, 3 |
| 2 | 4, 5 |

As shown in the example of Table 7B, domains 0 and 1 belong to domain group (DG) 0, domains 2 and 3 belong to domain group 1, and domains 4 and 5 belong to domain group 2. Similar to domains being owned by nodes (which may change), domains may be owned or part of certain domain groups. Domain groups may also be owned by nodes.

As shown in the example latency table, accessing memory in another domain that is in the same domain group would have its own associated cost, which in this example is 25 (group to group latency).

In some embodiments, domains are not moved out of domain groups while the guest environment is up and running.

In some embodiments, the NUMA layout on the hardware motherboards themselves may be taken advantage of by using domain groups. For example, suppose that two domains are in the same domain group on the same node, where the node has a two-socket motherboard. Each domain could be handled by a respective socket. The two domains that are on different sockets but on the same node may be ground together into the same domain group. Here, there are three levels of latency—one corresponding to access within the domain on the same socket, one corresponding to access on another domain in the domain group that is another socket but that is still on the same node, and another level corresponding to access on a domain outside of a domain group that is on a different node.

That is, in addition to virtualizing NUMA, as described herein, the implementation further takes advantage of hardware NUMA (e.g., by influencing the latency levels of the latency table).

Another example of indicating another level of memory latency is in the presence of a network-attached memory, as described above. For example, suppose that the network-attached memory is another node in the pod. Another NUMA domain corresponding to the network-attached memory could be established. A latency can be established for accessing the memory in the network-attached memory (e.g., as another latency value whose value is determined relative to the latency values for other distances of memory access).

In some embodiments, the cost functions do not look at the actual values in the latency tables, but instead evaluate their relation to each other, for example, to determine whether latencies are greater or less than other latencies (e.g., looking at relative comparisons, rather than absolute latency values).

As described above, the software-defined NUMA topology techniques described herein are goal-directed, and providing users the ability to define software-defined NUMA topologies allows them to establish a goal for optimizing latencies that other software can take advantage of. That is, the guest is provided information on what memory/processor layout will work well for the guest (application).

Without the software-defined NUMA topology, well-formed working sets may not be created, leading to data fragmentation and non-optimal memory latency accesses (e.g., as shown in the example of FIG. 11A, where the memories are mixed up). Whereas if the guest is provided a software-defined NUMA topology, working sets that are more similar to the example of FIG. 11C may be achieved, where the individual threads are aligned (e.g., co-located) with memory in a highly optimal format (where the working sets are formed based on the software-defined NUMA topology specified by a DBA).

Thus, by obeying software-defined NUMA topologies (which are able to be configured and presented in a software-defined server using the techniques described herein), performance increases may be realized.

Further, as described above, the software-defined NUMA domain topologies may be reconfigured on a per-application basis using the exact same hardware (or for different contexts, memory layouts/workloads, etc.).

As shown in the examples throughout, the ability to specify or configure software-defined NUMA configurations provides a type of latency control mechanism. For example, a database administrator may want to control their working sets. The MMUs, the caches, the processors, etc. may not allow the DBA to have such control. The software-defined NUMA configuration techniques described herein allow the database administrator to control their working set. In this way, the DBA can control latencies and can control where they place memory relative to processors.

Using the techniques described herein, a DBA is allowed to modify what the hardware looks like (to the guest) to better match their database design. This provides flexibility over traditional computing systems. For example, one challenge for Information Technology (IT) administrators and DBAs is that they are often unable to change their hardware. Once they buy the hardware, they are often committed to it for several years (e.g., for three to five years). The software-defined server and software-defined virtual NUMA topology techniques described herein provide such users the capability of changing the topology presented to the guest operating system, without having to change the actual hardware, where the software-defined NUMA topology further provides a template or guide/goal for how the hyper-kernel maps virtual resources to physical resources of the underlying hardware. For example, if they have a problem where they know that their application degrades in performance beyond 32 CPUs, they are provided the capability of being limited to 32 CPUs (there are applications, due to the way they are written, that hit a plateau after a number of CPUs and then they will start falling off).

Licensing limitations are another example of a constraint that can be addressed using the software-defined NUMA configuration techniques described herein. For example, suppose that given a DBA's memory layout, it would be desirable to have eight NUMA domains (e.g., because, for example, they are dealing with the eight regions across the United States). The use of eight NUMA domains is a logical organization. However, suppose that the DBA only has access to a two-socket motherboard. In traditional systems, this means that the DBA is limited to two NUMA domains, not the desired eight. However, using the techniques described herein, even with a two-socket motherboard, the DBA is allowed the capability to change their guest environment to be eight NUMA domains, as desired. That is, using the techniques described herein, the DBA is provided the capability of reflecting in hardware what they want in the guest.

In this way, the guest environment can be reconfigured for the different problem sets (e.g., to optimize memory access latencies). This knowledge of the desired goal may then be used by the hyper-kernel in the underlying hardware to make decisions when migrating resources (that may be biased towards memory latency optimization based on the desired goal indicated by the software-defined NUMA configuration).

As described above, guest operating systems may be NUMA-aware. Applications may also be NUMA-aware. As shown in the example of FIG. 11B, performance improvements may still be achieved for NUMA-aware guests, even if the application is NUMA-unaware.

As described above, a user such as a DBA administrator can use a configuration tool to configure both the hardware and virtual environment for their TidalPod, including the number of NUMA domains they wish to have.

For example, as described above, based on the desired number of pods (physical computing nodes), (virtual) processors, (guest) physical memory, and number of (software-defined) NUMA domains, a table of relative (virtual) latencies between (virtual/software-defined) domains is generated. A table is also generated that identifies what memory (represented by GPAs) and vCPUs are in each domain. In some embodiments, the starting GPA and the ending GPA are calculated for each domain. vCPUs are also assigned to domains (where in some embodiments, vCPUs have corresponding identifiers that are mapped to particular domains).

The following is an example of how to determine what vCPUs are assigned to a domain. In some embodiments, the number of vCPUs that are going to be instantiated is divided by the number of domains.

For example, consider the machine.def file, which indicates, for the (virtual) machine, a number of (software-defined) NUMA domains, number of (v)CPUs, and size of (guest) physical memory. Given these three attributes, the number of CPUs divided by the number of domains gives the CPUs per domain. Similarly, the amount or size of memory is divided by the number of domains. The addresses for the segments of memory belonging to each domain may then be calculated.

In one embodiment, it is decided that low domain numbers have high memory. Existing hardware typically does not do that. Rather, existing hardware typically has low domain numbers having low memory. One example reason for having low domain numbers having high memory is because of the initial layout of the memory when the guest is very first started. That is, for example, saying that "Domain zero starts here, is this size."

Thus, in one embodiment, the aggregate number of virtualized resources is divided across the domains. Other divisions of virtualized resources may be performed in various embodiments.

Thus, a mapping of (virtual) CPUs to (software-defined) NUMA domains is established (where in some embodiments, each vCPU has a corresponding identifier that is mapped to a software-defined NUMA domain). That is, in some embodiments, using the techniques described herein, vCPUs (identified by their corresponding vCPU identifiers) are mapped to (software-defined) NUMA domains, and GPAs are mapped to (software-defined) NUMA domains. In one embodiment, the table used for mapping of the vCPUs and GPAs to the domains is an ACPI (Advanced Configuration and Power Interface) SLIT (system locality information table).

As described above, NUMA-aware applications can take advantage of the virtual NUMA topology. For example, if a DBA is running four database instances concurrently on four NUMA domains (e.g., because the DBA is running analytics on four departments for their retail store), the goal-directed software-defined NUMA working set management techniques described herein can help optimize latencies when running the database and, for example, performing queries.

As another example, referring to the example shown in FIG. 11C, where memory was tightly bound, numactl commands were run that bind the memory walk to CPU zero and use local allocation for NUMA memory. In this example, this is saying, for CPU zero, only allocate memory in that domain that CPU zero is in, and there are four of them—zero, two, four, and six. This is a way of trying to ensure that whatever memory is allocated, it is a GPA that is in the software-defined NUMA domain.

While numactl is one example of a command that can utilize the software-defined NUMA tables described herein, other tools may also be used that leverage the tables. For example, libraries, such as Open MPI, include tools for utilizing NUMA domain information. Open MPI, for example, determines what thread grouping should be in a NUMA domain. From the guest operating system's perspective, these libraries are specifying that these threads should be associated with a (software-defined) NUMA domain, which limits the (guest) physical addresses and (virtual)

CPUs they can use (because the guest does not know anything about/is not aware of the CPUs it observes as actually being virtual).

From the guest operating system view, when told how it wants processes scheduled, it will assign the pool of threads, for example, to a specific CPU in the domain to which the thread grouping is assigned.

With respect to the hyper-kernel, when performing working set optimizations, the hyper-kernel takes advantage of the information about the software-defined NUMA domains in making optimal decisions (e.g., when handling stalls), in order to map virtual resources to physical resources.

For example, on the hyper-kernel side, as it is emulating the hardware, the hyper-kernel is deciding, for example, that "virtual processors zero to one belong to the domain zero." The hyper-kernel will then, when a GPA-vCPU mismatch is observed (e.g., the vCPU and GPA are not co-located on the same node), try to make sure that they are aligned in a proper way to optimize performance based on the NUMA domain in the guest.

In some embodiments, the mismatch causes a stall, where the physical processor "pCPU" instantiating the vCPU is not co-located with the page of memory mapped to the GPA (they are not on the same computing node, for example).

In some embodiments, cost functions are used to determine an optimal way to handle the stall. For example, the cost functions described above are adapted to take advantage of the information about the virtual NUMA domains in making optimal decisions. The software-defined NUMA domain information that is used includes the information encoded in the above software-defined NUMA domain tables.

The following is an example of pseudocode for how a hyper-kernel handles a stalling event.

```
page stall -> gpa, vcpu.id
nd.map[4].owner = bool(1,0)
gpa.domain = gpa/n_domains
vpcu.domain = vcpu.id/n_domains
if (gpa_domain == gpa.owner)
    migrate(vpcu.id, gpa.owner)
elseif (vpcu.domain == this.node)
    request_page(gpa, gpa.owner)
else
    request_page(gpa, gpa_owner)
```

In this example, suppose that a page stall has occurred and is detected by the hyper-kernel on the node on which the stall occurred. The information associated with the stall indicates a guest physical address (GPA) that the stall occurred on. The page stall occurred, for example, because the guest operating system tried to hit a page in memory (with an associated GPA), but the page of memory corresponding to the GPA was not on the same node as (i.e., not co-located with) the pCPU that was instantiating the vCPU that needed the GPA, and thus the pCPU stalled. The hyper-kernel on the node with the stalled pCPU (e.g., core or hyperthread currently implementing the vCPU) detected the stall and is determining how to handle the page stall.

In some embodiments, in response to the page stall, the hyper-kernel determines the GPA and vCPU_ID (identifier of the vCPU that stalled). In some embodiments, the GPA and vCPU identifier are provided to the hyper-kernel/virtual machine manager when the stall occurs. The GPA and identifier of the vCPU that stalled are two pieces of information that the hyper-kernel will leverage. The hyper-kernel also has a software-defined NUMA domain map. The NUMA domain map indicates what domain(s) are owned by a node.

In this example, the hyper-kernel determines a GPA modulo number of domains, or GPA divided by the number of domains (other ways to calculate domains may be performed) in order to determine what domain the GPA implicated in the stall is mapped to. For example, suppose that there are four domains. The full array of GPAs is broken down into quarters to determine which of the four domains the needed GPA is mapped to. Similarly, in some embodiments, to determine the domain to which the vCPU that stalled is mapped to, the vCPU_ID of the vCPU is divided by the number of domains.

After the domain of the GPA on which the stall occurred and the domain of the vCPU that stalled are determined, one example determination made by the hyper-kernel is whether the GPA domain equals (is the same as) the vCPU domain. Another determination is whether the node to which the GPA domain is mapped and the current owner (node) of the GPA are the same. If so, in this case, the stall is handled by migrating the vCPU_ID to the GPA. In this case, it has been determined that the GPA is in the domain (because the current owner (node) that owns the GPA is also the node that has the domain to which the GPA had been assigned to). Moving the GPA over to the node that the vCPU is on would take the GPA out of the domain. Thus, instead, the vCPU should be migrated to the GPA so that they can be on co-located on the same node that owns the GPA domain.

Else, if the vCPU domain is equal to or belongs to "my" node or domain (e.g., the node on which the stall is happening, where the "my" refers to the hyper-kernel on the node being the one making the determination described in the example pseudocode) and if the vCPU is here, then the page is requested. That is, the page is moved from wherever it is to where the vCPU is (or whatever node on which the stall occurred). This is because it is believed that the vCPU is in the appropriate place (because the vCPU is in-domain (i.e., the domain to which it was mapped according to the software-defined NUMA topology configuration)).

Else, suppose that the GPA does not match (the GPA is out of domain) and the vCPU does not match (vCPU is also out of domain). In this example, the hyper-kernel requests the page (e.g., as a default option). This is because both the vCPU and the GPA are out of domain.

In other embodiments, the hyper-kernel does not necessarily request the page. For example, other information, such as information about threads, other cost functions, etc. are evaluated (that is, factors other than software-defined NUMA topology may be considered when determining how to migrate resources to resolve a stall). Other default behavior can also be performed.

In some embodiments, the determinations do not directly result in actions, but rather, provide a cost for taking an action. For example, inclusion of NUMA information into a set of costs functions (such as those described above) may result in a page request cost greater than zero, or translate into a vCPU migration cost that is greater than zero.

The costs may then be compared to determine what action to take (e.g., by selecting the lowest cost action). Other cost functions that determine the cost of vCPU migration and/or cost of requesting the page based on other factors may also be evaluated. The resulting lower cost option may then be selected to be performed to handle the stall. That is, the software-defined NUMA domain information is one factor in determining the cost of vCPU migration versus requesting a page (and would not necessarily on its own decide whether a page is requested).

In some embodiments, if the hyper-kernel could not make a decision based on the software-defined NUMA domain information, then other cost functions may be used to decide what action to take in handling the stall.

Another example way to structure the cost functions is not to do such a test (based on software-defined NUMA domain information) on top of other evaluations, but to integrate it into other cost computations. In this case, the hyper-kernel is retrieving the cost value, where the test is part of a larger cost function that evaluates costs based on other factors.

In some embodiments, the values of the table of relative virtual access latencies may be used by the hyper-kernel, but need not be. In some embodiments, the table of relative latencies is used by the guest application to decide how to align its own memory in what it expects a working set to be. Applications such as databases may perform such processing. Open MPI and three dimensional fluid simulations are other examples of applications that may be strongly influenced by NUMA domains.

In some embodiments, a lack of NUMA domains is equivalent to a single domain, and when the guest operating system maps a physical page to a virtual address, the pages will be scattered around in a manner as shown in FIG. 11A, because there are no latency discrepancies.

If there are multiple NUMA domains, then the operating system may map the physical address to the virtual address more to optimize latencies (e.g., to reduce latencies). This is shown in the example of FIGS. 11B and/or 11C. If the hardware could be tapped into, this is what would be observed. This may be regardless of whether the system is a software defined server or hardware server—this is the guest memory allocation system indicating that it is aware that a given CPU, which a given thread has been asked to run on, will perform better with a given physical address space.

In various embodiments, the software-defined NUMA domain tables allow hints to be given to the guest to make optimal decisions based on latencies.

While in some embodiments, hooks are provided to allow the guest control, with NUMA, the guest does not need to be modified, as long as the guest is NUMA aware. Applications that are NUMA-aware also need not be modified.

In some embodiments, the software-defined NUMA tables are subject to industry specifications that, for example, define that there is a limited amount of memory for those tables. That is, a table cannot be built that exceeds that memory. There may also be limits on NUMA domains (e.g., number of NUMA domains).

With respect to the goal-directed software-defined NUMA working set management techniques described herein, the more tightly constrained and knowledgeable the software-defined server system is about working sets, the more accurate the hyper-kernels will be in aligning the CPUs and that memory. It may be the case that a four socket motherboard does not perform as well as a two socket motherboard, which does not perform as well as a one socket motherboard. This means that, for example, if the memory could be aligned on a one socket motherboard, it will perform better than an equivalent piece of hardware with the same amount of memory but that requires more sockets. Using the techniques described herein, the smaller hardware speed performance gains can be taken advantage of that cannot be attained on larger machines.

The hyper-kernel described herein includes a place to put optimizations that do not exist anywhere else. Such optimizations in the hyper-kernel include the cost functions and working set management described herein, which is not in the hardware or in the operating system. Rather, it is managed by the hyper-kernel (or virtual machine manager). This may lead to cases where applications perform better on a software-defined server than on bare metal, which may be due to various factors.

As shown in the above example, the goal-directed software-defined NUMA working set management techniques described herein provide a set of capabilities that allow users such as a DBA or an application person to develop working set behavior on a software-defined server.

The above pseudocode is an example of how a decision might be made on the GPA domain and vCPU domain.

In some embodiments, rather than making a pre-emptive decision, where actions such as migrating the vCPU or requesting a page are specifically called/performed at decision points (as in the above example pseudocode for handling a stall using software-defined NUMA topology information), this information is embedded in cost functions or polynomials to provide a more balanced view. For example, as described above, rather than specifically taking an action at a point, request costs and migration costs are determined (e.g., to be greater than zero) as a result (rather than the result being to take an action). That is, the decision results will bias towards tending to a request page or tending to migrate, as shown in the example pseudocode below.

```
page stall -> gpa, vcpu.id
nd.map[4].owner = bool(1,0)
gpa. domain = gpa/n__domains
vpcu.domain = vcpu.id/n__domains
if (gpa__domain == gpa.owner)
    tend to migrate(vpcu.id, gpa.owner)
elseif (vpcu.domain == this.node)
    tend to request__page(gpa, gpa.owner)
else
    tend to request__page(gpa, gpa__owner)
```

Migration of Software-Defined NUMA Domains

The following are further example details regarding NUMA domain migration in a software-defined server.

In some embodiments, (memory) capacity limits are observed, and when the capacity limits are being exceeded for a particular NUMA domain on a given node, it may be beneficial to migrate the (software-defined) NUMA domain to another node.

The below is an example of pseudocode for performing NUMA domain migration.

```
Numa__domain[n__domains] = {
    .owner
    .cpu_set
    .gpa_set
}
If (node memory > ack.mem)
{
    move(node[2], (node__id+1))
}
```

In this example, there is a data structure, or an array of structures, that is N domains wide. In some embodiments, each structure has an owner (e.g., node). In some embodiments, the (set of) data structure(s) also includes a CPU set indicating what (virtual) CPUs are in each domain and a GPA set for what GPAs are in each domain. This may be defined at system initialization.

However, the node-to-domain mapping can change. For example, at initialization time, the domains may be split equally across the nodes (other distribution of domains across nodes may also be performed).

However, suppose that a memory limit or capacity limit on a node is reached when the software-defined server is running. In some embodiments, if a domain on the node has not been used much (e.g., most of the memory has not been allocated), one example decision made by the hyper-kernels is to move that entire domain to a different computing node in a TidalPod.

As shown in the example pseudocode above, if node memory is greater than a threshold level (e.g., entered a panic mode), then a move or migration of a software-defined NUMA domain is performed, where the software-defined NUMA domain is moved to a different node.

If a node has or owns multiple domains, a determination may be made of which domain to move. For example, the domain that is used less, or has not been recently used may be moved. As another example, if most of the pages in that domain are in an LRU (least recently used) table, then that domain is moved. In some embodiments, a decision may also be made about which node the software-defined NUMA domain is to be migrated to (e.g., changing the mapping of a software-defined NUMA domain to a computing node).

In some embodiments, when moving a domain, given a set of messages, only a certain number of the pages need be moved to generate more space. Once the vCPUs in that domain become active again, the hyper-kernel will tend to try to migrate those vCPUs and those pages to that domain (e.g., because those vCPUs may tend to need those pages, and co-locating them may result in fewer stalls). That is, not all of that movement need be performed preemptively. In some embodiments, as shown in the example pseudocode above, the identity of the node that owns a domain may be used in the resource migration decision. Thus, changing the mapping may influence how the resource migration decision is made. For example, in order to more closely align to the software-defined NUMA topology, the hyper-kernel may be biased towards causing virtual processors and guest physical memory of a domain to move to the new node that now owns the domain.

In some embodiments, an LRU (least recently used) data structure of memory is maintained. In some embodiments, a sampler is used that goes through and unmaps pages temporarily. If the page does not become remapped, then it stays on the LRU. In some embodiments, if the page becomes older in the LRU, the hyper-kernel starts to move off the oldest part of the LRU to a different node, regardless of domain.

If a stall happens due to the movement, then the page may be pulled back, or the vCPU may be migrated (depending, for example, on the evaluation of cost functions, such as those described above).

The capability of moving software-defined NUMA domains, as described herein, allows ownership of a domain to be reassigned in such a way that a large amount of memory need not be preemptively moved, because the cost functions will ultimately attempt to align (co-locate) memory and processors (and form working sets) in a way to minimize stalls (e.g., as long as they are not in a memory critical area). This is a form of machine learning.

In the case where there is a situation where, for example, there are four nodes and eight NUMA domains, but the NUMA domains are very, very lightly used, all of the NUMA domains can be placed in one node. In some embodiments, this is an optimal scenario, and provides the capability and flexibility of determining, in larger scale decisions, where the optimal solution is (where, for example, the goal is to find an optimal performance solution, and that optimal performance solution is for all NUMA domains to be on one node). This is different from standard NUMA.

In some embodiments, the optimal solution (and placement of memory/processors) is towards that goal that the DBA person already defined. Or if they haven't, the hyper-kernel can determine or discover optimal working set management.

In various embodiments, thread pools may also use the goal-directed software-defined NUMA working set management described herein. If thread pools are combined with software-defined NUMA domains, performance is improved. Guest threads perform well when the great thread is assigned the same task all the time. Simulations are an example of this. Thread pools where a thread is assigned random tasks based on availability may not work as well for a software-defined server because a thread may be frequently moving on and off nodes. The software-defined NUMA domains techniques described herein allow the hyper-kernel to fill out and enhance its knowledge on what is occurring, and through a combination of guest threads and software-defined NUMA domains, a better, tighter integration of memory to CPU usage can be achieved. That is, well-formed working sets may be built. Examples of well-formed working sets are shown in the example of FIG. 11C. Examples of working sets that are not well formed are shown in the example of FIG. 11A.

Using the goal-directed software-defined NUMA working set management techniques described herein, the hyper-kernel is able to readily observe correlations between vCPUs and GPAs (because the hyper-kernel has knowledge of what it is providing to the guest—e.g., the ACPI table showing assignment of vCPUs and GPAs to domains). Using this information, the hyper-kernel can make improved and more optimal decisions on deciding that a working set associated with a CPU (e.g., by domain) should be co-located together.

For example, from the guest perspective, suppose the guest operating system is presented with two NUMA domains. The guest will attempt to allocate a working set in a certain manner because it is optimal. However, the hyper-kernel need not align vCPUs and GPAs on the physical hardware in a manner that exactly reflects the alignment the guest operating system is performing. On the hyper-kernel side, the hyper-kernel may decide, for example, to place pages on certain nodes completely independently. In some embodiments, what the hyper-kernel will attempt to do is to not have the page far out of domain. In this case, it is not necessarily that the hyper-kernel will try to align the physical resources to the guest at a page-per-page level, but that the hyper-kernel will attempt to align itself in a manner for optimal performance, which may be that the hyper-kernel will at least attempt to have vCPUs and pages on the same node (even if not in the same domain). This would prevent fragmentation.

By having such software-defined NUMA configuration information specified (which indicates, for example, one way that a user recommends to have processors and memories grouped together), and with the guest being aware of such a goal, this information can be used to optimize performance. The guest optimizes performance based on the NUMA topology it is presented, and the hyper-kernel optimizes resource location while taking the software-defined NUMA configuration into account/consideration.

In some embodiments, after boot, the hyper-kernel is more passive than active. A capability is provided to those levels above the hyper-kernel, and the levels above the hyper-kernel make those decisions. In some embodiments, the hyper-kernel tries to conform to the promise that has been made (e.g., the software-defined NUMA domain topology provided to the guest environment and the mapping of virtualized resources to those software-defined NUMA domains), but attempts to perform rewrites, or change behavior, are not made. Rather, an ideal or goal is provided along with rules by which the system abides by. If those rules are utilized, then the hyper-kernel will behave accordingly. In some embodiments, this is what is meant by "goal-directed."

Using the techniques described herein, ground rules are set that may be worked with. If these ground rules are conformed to, then the hyper-kernel will work together on this.

Providing a user such as a DBA a way to configure software-defined NUMA domains for the guest environment allows the DBA to set ground rules, for example, of how they would like working sets managed to optimize memory latencies. This then provides hints to the hyper-kernel for latency optimization.

In some embodiments, the hyper-kernel's task is to map virtual resources to physical resources. The DBA or application programmer can provide the hyper-kernel guidelines as to how they would like to bias that mapping (e.g., to optimize memory latencies). In some embodiments, the hyper-kernel, when mapping virtual resources to physical resources, takes these provided guidelines into account to optimize latency (as the DBA has indicated or expressed a desire for NUMA domains and a way for processors and memory to be aligned to those NUMA domains).

There are various decisions on which way the hyper-kernel could map virtual resources to physical resources, and using the software-defined NUMA configuration techniques described herein, a DBA or application programmer can provide the hyper-kernel guidance as to how to bias that mapping of virtual to physical resources. As described herein, defining NUMA configurations allows for latency optimization for their application workload, and the DBA or application programmer can express that via defining domains, where those domains are used by the hyper-kernel to help optimize for that same goal of latency optimization, at least, for example, so that the hardware behaves in way that correlates with the DBA's goal of that latency optimization.

In some embodiments, a goal is provided for the guest to meet, and that is the NUMA domains (e.g., software-defined NUMA domain topology and assignment of virtualized resources to those domains). Because it is known what that goal is, the hypervisor or hyper-kernel can strive to meet that same goal. This provides a common playing field. Attempts are made to match the same goal of the applications.

The following is another example of performance improvements facilitated by the goal-directed software-defined NUMA working set management techniques described herein. Open MPI simulations allow for simulations across multiple machines. It can be challenging when trying to figure out what combination of nodes versus sub-domains makes the best simulation. Suppose that a simulation was on five machines, and then it is placed on one machine. This would require rearranging parameters in terms of the number of sub domains. Using the techniques described herein, a user may simply specify five software-defined NUMA domains or one NUMA domain, and the system may be reconfigured dynamically according to the NUMA configuration. In this way, there is much more flexibility in how resources are allocated.

In some embodiments, the software-defined NUMA techniques described herein provide other benefits that can be leveraged to improve performance. For example, by using domain groups and NUMA domains, pCPU threads can be pinned to pCPUs in order to take advantage of the actual underlying hardware's NUMA domains.

Example Software-Defined NUMA domains in a Software-Defined Server

The following are examples of software-defined NUMA domains under the system described herein:

In these examples, there is a same set of hardware, with different tables for different configurations (different software-defined NUMA topologies).

The following is an example case of one domain (where "node" here is a NUMA domain). Tables 8A and 8B are example corresponding software-defined NUMA topology tables. Table 8A illustrates an embodiment of a mapping of virtualized resources to software-defined NUMA domains.

TABLE 8A

| available: one node (0) | |
| --- | --- |
| node 0 | cpus: 0 1 2 3 4 5 |
| node 0 | size: 129999 MB |
| node 0 | free: 126163 MB |

Table 8B illustrates an embodiment of node (domain) distances (latencies) presented to a guest operating system.

TABLE 8B

| node | 0 |
| --- | --- |
| 0 | 10 |

The following is an example case of two TidalScale computing nodes, where each node has a domain. Tables 9A and 9B are example corresponding software-defined NUMA topology tables. Table 9A illustrates an embodiment of a mapping of virtualized resources to software-defined NUMA domains.

TABLE 9A

| available: two nodes (0-1) | |
| --- | --- |
| node 0 | cpus: 0 1 2 |
| node 0 | size: 65512 MB |
| node 0 | free: 63918 MB |
| node 1 | cpus: 3 4 5 |
| node 1 | size: 64487 MB |
| node 1 | free: 62679 MB |

Table 9B illustrates an embodiment of node (domain) distances (latencies) presented to a guest operating system.

TABLE 9B

| node | 0 | 1 |
| --- | --- | --- |
| 0 | 10 | 250 |
| 1 | 250 | 10 |

The following is an example with four NUMA domains that are spread out across two TidalScale physical computing nodes. Tables 10A and 10B are example corresponding software-defined NUMA topology tables. Table 10A illustrates an embodiment of a mapping of virtualized resources to software-defined NUMA domains.

TABLE 10A

| available: four nodes (0-3) | |
|---|---|
| node 0 | cpus: 0 4 |
| node 0 | size: 32756 MB |
| node 0 | free: 31881 MB |
| node 1 | cpus: 1 5 |
| node 1 | size: 32756 MB |
| node 1 | free: 31932 MB |
| node 2 | cpus: 2 |
| node 2 | size: 32756 MB |
| node 2 | free: 32020 MB |
| node 3 | cpus: 3 |
| node 3 | size: 31731 MB |
| node 3 | free: 30757 MB |

Table 10B illustrates an embodiment of node (domain) distances (latencies) presented to a guest operating system.

TABLE 10B

| node | 0 | 1 | 2 | 3 |
|---|---|---|---|---|
| 0 | 10 | 250 | 250 | 250 |
| 1 | 250 | 10 | 250 | 250 |
| 2 | 250 | 250 | 10 | 250 |
| 3 | 250 | 250 | 250 | 10 |

Suppose that NUMA subdomains were included, in which case the following example configuration may be established—note, for example, the (virtual) CPU assignment. Tables 11A and 11B are example corresponding software-defined NUMA topology tables. Table 11A illustrates an embodiment of a mapping of virtualized resources to software-defined NUMA domains:

TABLE 11A

| available: four nodes (0-3) | |
|---|---|
| node 0 | cpus: 0 4 |
| node 0 | size: 32756 MB |
| node 0 | free: 31881 MB |
| node 1 | cpus: 1 5 |
| node 1 | size: 32756 MB |
| node 1 | free: 31932 MB |
| node 2 | cpus: 2 |
| node 2 | size: 32756 MB |
| node 2 | free: 32020 MB |
| node 3 | cpus: 3 |
| node 3 | size: 31731 MB |
| node 3 | free: 30757 MB |

Table 11B illustrates an embodiment of node (domain) distances (latencies) presented to a guest operating system.

TABLE 11B

| node | 0 | 1 | 2 | 3 |
|---|---|---|---|---|
| 0 | 10 | 125 | 250 | 250 |
| 1 | 125 | 10 | 250 | 250 |
| 2 | 250 | 250 | 10 | 125 |
| 3 | 250 | 250 | 125 | 10 |

Additional Details Regarding Moving Ownership of Software-Defined NUMA Domains

In some embodiments, NUMA domains, in one form, are mappings of CPU and memory sets (and are an example of working sets). Those mappings include estimated latencies when a CPU accesses memory from a different domain.

When looking at this from a TidalScale hyper-kernel point of view, where pages and vCPUs are migrated around, it may be desirable to attempt to maintain a vCPU and memory mapping. Maintaining a promise on latency is highly challenging. In some embodiments, the software-defined NUMA can be reduced to a mapping between vCPUs and memory pages.

With the goal-directed software-defined NUMA techniques described herein, the domains may be used as a strong goal to keep vCPUs and pages (guest physical memory with guest physical addresses (GPAs)) within a software-defined NUMA domain. Since software-defined NUMA domains are not tied to or associated with actual hardware, the hyper-kernel will place NUMA domains where it believes to be most optimal to meet the compute goals for the software-defined server. If all of the memory in use (allocated with non-dormant pages) fits in one node, then all of the software-defined NUMA domains may be placed on one node. If it is more optimal to split domains, then the hyper-kernel may do that as well (e.g., by changing software-defined NUMA domain-to-computing node mappings).

Consider an example using four computing nodes, and eight software-defined NUMA domains:

Example Assumption: at the beginning of the workload, the allocated memory can fit on one node. As the workload progresses, the memory will not fit on one node anymore.

In some embodiments, there is a portion of the machine learning code (e.g., implemented as part of the hyper-kernel) that will evaluate the vCPU placement and page placement during a stall.

In some embodiments, if the vCPU is not on the node owner of the software-defined NUMA domain, there is a preference or bias to move the vCPU to the node that owns the software-defined NUMA domain.

In some embodiments, if the page is not on the node owner of the virtual NUMA domain, there is a preference or bias to move the page to the node that owns the software-defined NUMA domain.

In this example, suppose at the start of the guest environment, all of the allocated memory and vCPUs have been placed together on one node. Because the hyper-kernel has determined that it is optimal, all software-defined NUMA domains are on that same node. This optimizes the performance of the software-defined server.

Suppose that as memory is allocated, a point is reached where having all of the physical pages on one node can no longer be supported. In some embodiments, the least recently used pages are looked at and those are moved off of the node to make room. However, this may fragment pages off of the software-defined NUMA domain owners.

Instead, in some embodiments, the hyper-kernel uses information pertaining to the software-defined NUMA domains to aid in placement. For example, in some embodiments, the hyper-kernel makes a decision to move the software-defined NUMA domain that is least recently used, has fewer allocated pages, or is more tightly coupled with the VCPUs. The software-defined NUMA domain is then changed to another node, and the hyper-kernel starts moving pages in that NUMA domain off to the other node. As vCPUs are run that belong to the software-defined NUMA domain that has been moved, the machine learning decisions will bias decisions to move the pages and vCPUs belonging to that domain to the other node, thus helping to clear out the node of high memory pressure.

Thus, by allowing ownership of software-defined NUMA domains to change from node to node, and making proactive decisions on which node owns a software-defined NUMA domain, memory and vCPU pressure on a software-defined server can be normalized.

Figure 13:
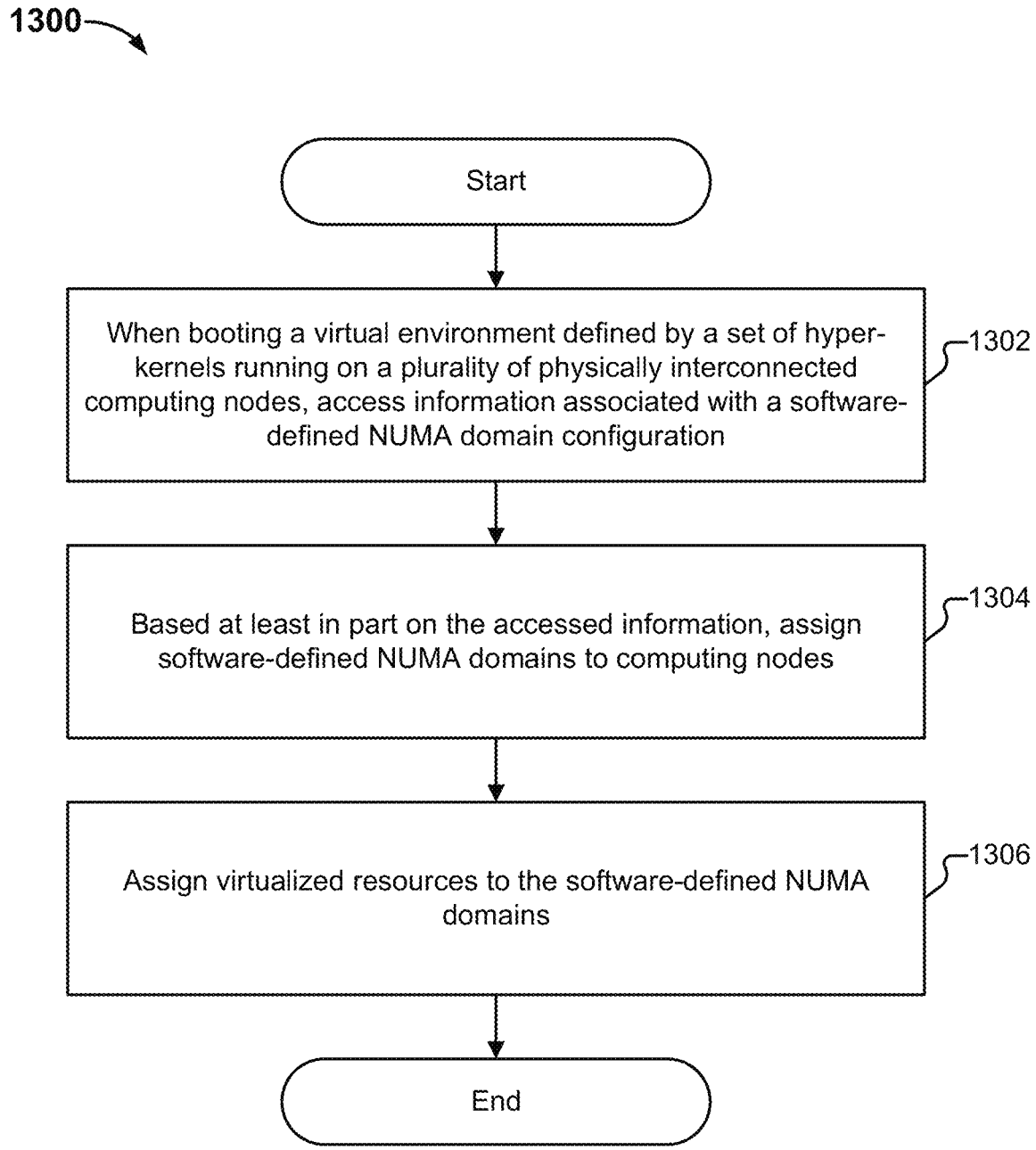
FIG. 13 is a flow diagram illustrating an embodiment of a process for configuring software-defined NUMA domains in a software defined server.

FIG. 13 is a flow diagram illustrating an embodiment of a process for initializing a software-defined server having software-defined NUMA domains in a software defined server. In some embodiments, process 1300 is executed by a guest operating system. The process begins at 1302 when information associated with a software-defined NUMA (Non Uniform Memory Access) domain configuration is accessed. The configuration indicates a topology including multiple software-defined NUMA domains. In some embodiments, the software-defined NUMA configuration is accessed when booting a guest operating system to be run on a virtual environment defined by a set of hyper-kernels running on a group of physically interconnected computing nodes (e.g., a software-defined server, as described herein). Examples of software-defined NUMA configurations are described above. At 1304, based at least in part on the accessed information, software-defined NUMA domains are assigned to computing nodes. At 1306, virtualized resources are assigned to the software-defined NUMA domains. Various embodiments of assigning virtualized resources to software-defined NUMA domains are described above.

Figure 14:
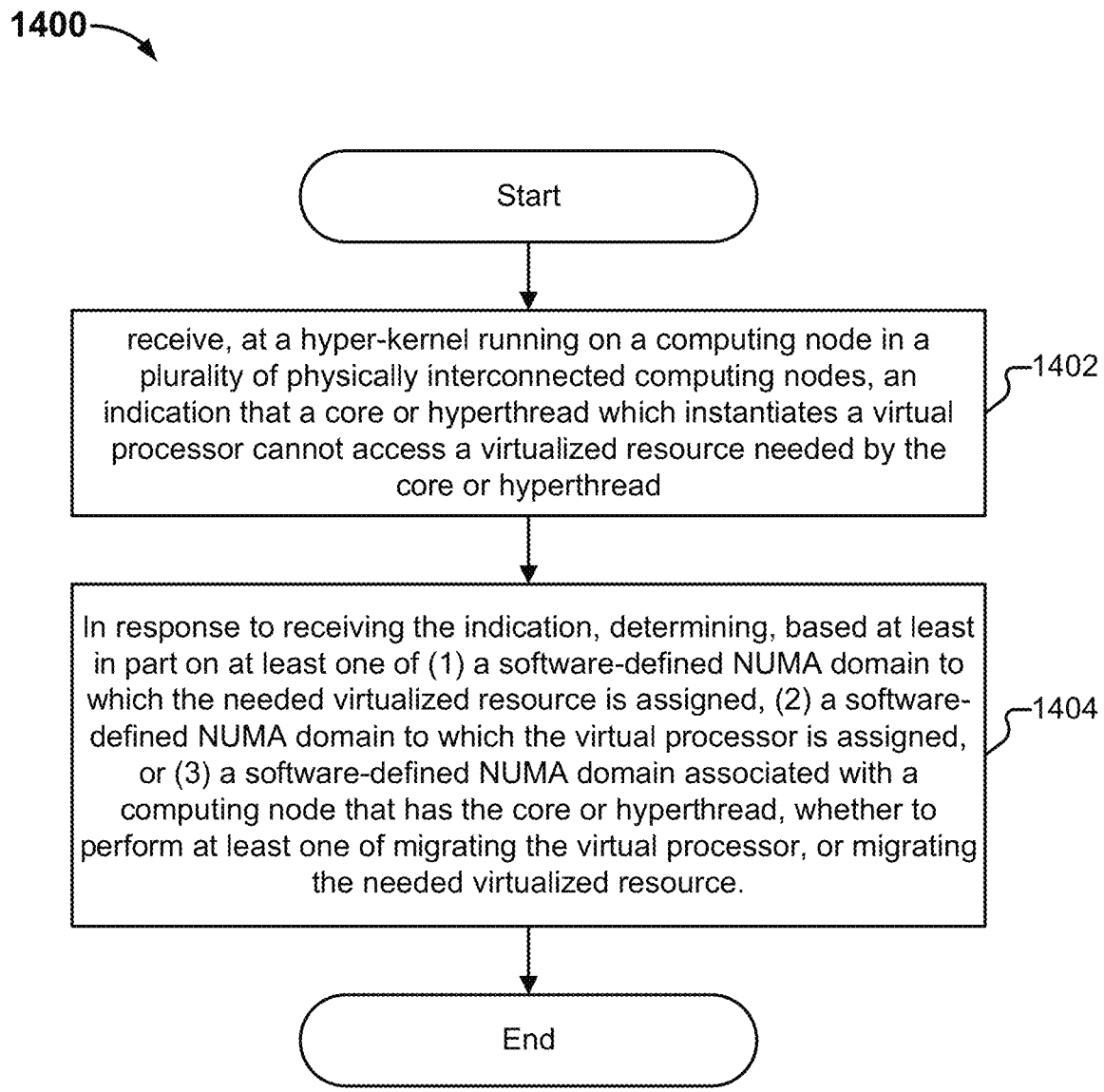
FIG. 14 is a flow diagram illustrating an embodiment of a process for handling a stall involving software-defined NUMA domains.

FIG. 14 is a flow diagram illustrating an embodiment of a process for handling a stall involving software-defined NUMA domains. In some embodiments, process 1400 is executed by a hyper-kernel. The process begins at 1402 when an indication is received that a core or hyperthread which instantiates a virtual processor cannot access a virtualized resource needed by the core or hyperthread. At 1404, in response to receiving the indication, it is determined, based at least in part on at least one of (1) a software-defined NUMA domain to which the needed virtualized resource is assigned, (2) a software-defined NUMA domain to which the virtual processor is assigned, or (3) a software-defined NUMA domain associated with a computing node that has the core or hyperthread, whether to perform at least one of migrating the virtual processor, or migrating the needed virtualized resource. Various embodiments of handling stalls in a virtualized environment involving software-defined NUMA domains are described above.

Additional Embodiments

Configuring virtual NUMA domains in a software defined server includes, when booting a virtual environment or virtual information, accessing information associated with a virtual NUMA domain configuration, the configuration indicating a topology comprising a plurality of virtual NUMA domains. The virtual environment is defined by a set of hyper-kernels running on a group of physically interconnected computing nodes, where the virtual environment is defined based on the accessed virtual NUMA domain information. A guest operating system is run on the virtual environment. Virtualized resources in a set of virtualized resources made available to the guest operating system are assigned to virtual NUMA domains, and the virtual NUMA domains are assigned to computing nodes in the group of physically interconnected computing nodes.

Handling a stall using virtual NUMA domains includes, in response to receiving an indication, at a hyper-kernel, that a core or hyperthread which instantiates a virtual processor cannot access a virtualized resource needed by the core or hyperthread, determining, by the hyper-kernel, whether to perform at least one of (1) migrating the virtual processor and (2) migrating the needed virtualized resource. The determination is based at least in part on at least one of, a virtual NUMA domain to which the needed virtualized resource is assigned, a virtual NUMA domain associated with a computing node that currently owns the needed virtualized resource, a virtual NUMA domain to which the virtual processor is assigned, and a virtual NUMA domain associated with a computing node that has the core or hyperthread. The hyper-kernel is included in a set of hyper-kernels running on a group of physically interconnected computing nodes. A guest operating system is run on a virtual environment that is defined by the set of hyper-kernels. The virtual environment has a topology that includes virtual NUMA domains. A set of virtualized resources is made available to the guest operating system. The set of virtualized resources includes a set of virtual processors. Virtualized resources in the set of virtualized resources are assigned to the virtual NUMA (non-uniform memory access) domains. The virtual NUMA domains are assigned to computing nodes in the group of physically interconnected computing nodes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer system, comprising:
   a plurality of physically interconnected computing nodes, wherein each of the plurality of physically interconnected computing nodes are separate physical devices;
   a set of hyper-kernels, wherein:
      each respective hyper-kernel of the set of hyper-kernels executes on a separate respective one of the plurality of physically interconnected computing nodes, and
      the set of hyper-kernels collectively operate to form a software-defined server that comprises the aggregated resources of the plurality of physically interconnected nodes and on which a virtual machine spanning aggregated resources of the plurality of physically interconnected computing nodes executes; and
   a guest operating system executing on the virtual machine spanning the plurality of physically interconnected computing nodes,
   wherein:
      when booting the virtual machine defined by the set of hyper-kernels executing on the plurality of interconnected computing nodes, information associated with a software-defined NUMA (Non Uniform Memory Access) domain configuration provided by at least one hyper-kernel is accessed by the guest operating system that is executing on the virtual machine, the software-defined NUMA configuration indicating a topology comprising a plurality of software-defined NUMA domains,
      based at least in part on the accessed information, software-defined NUMA domains in the plurality of software-defined NUMA domains are assigned to computing nodes in the plurality of physically interconnected computing nodes, and
      virtualized resources in a set of virtualized resources are assigned to the software-defined NUMA domains, wherein the set of virtualized resources is made available to the guest operating system that is run on the virtual machine.

2. The computer system of claim 1 wherein the software-defined NUMA configuration comprises a mapping of virtual processors and guest physical addresses to the plurality of software-defined NUMA domains, and wherein the mapping is presented to the guest operating system.

3. The computer system of claim 1 wherein the software-defined NUMA configuration comprises a set of relative access latencies between the plurality of software-defined NUMA domains, and wherein the set of relative latencies is presented to the guest operating system.

4. The computer system of claim 3, wherein the set of relative access latencies is determined based at least in part on a relative mapping of the software-defined NUMA domains to the plurality of physically interconnected computing nodes.

5. The computer system of claim 1 wherein the at least one hyper-kernel maintains a mapping between the software-defined NUMA domains and the plurality of physically interconnected computing nodes.

6. The computer system of claim 1 wherein the at least one hyper-kernel maintains a first mapping of a virtualized resource of the set of virtualized resources and a current computing node of the plurality of physically interconnected computing nodes on which the virtualized resource currently resides.

7. The computer system of claim 6 wherein the at least one hyper-kernel maintains a second mapping of the software-defined NUMA domains to the current computing node.

8. The computer system of claim 1 wherein the assigning of the software-defined NUMA domains to the computing nodes is based at least in part on a user specification of a number of desired software-defined NUMA domains, and a number of computing nodes in the plurality of physically interconnected computing nodes.

9. The computer system of claim 1 wherein the software-defined NUMA configuration is determined based at least in part on information included in an emulated BIOS (Basic Input/Output System).

10. A method, comprising:
when booting a virtual machine defined by a set of hyper-kernels running on a plurality of physically interconnected computing nodes, accessing, by a guest operating system, information associated with a software-defined NUMA (Non Uniform Memory Access) domain configuration, the software-defined NUMA configuration indicating a topology comprising a plurality of software-defined NUMA domains, wherein:
  each of the plurality of physically interconnected computing nodes are separate physical devices,
  each respective hyper-kernel of the set of hyper-kernels executes on a separate respective one of the plurality of physically interconnected computing nodes,
  the set of hyper-kernels collectively operate to form a software-defined server that comprises the aggregated resources of the plurality of physically interconnected nodes and on which a virtual machine spanning aggregated resources of the plurality of physically interconnected computing nodes executes; and
  the guest operating system executes on the virtual machine spanning the plurality of physically interconnected computing nodes;
based at least in part on the accessed information, assigning software-defined NUMA domains in the plurality of software-defined NUMA domains to computing nodes in the plurality of physically interconnected computing nodes; and
assigning virtualized resources in a set of virtualized resources to the software-defined NUMA domains, wherein the set of virtualized resources is made available to the guest operating system.

* * * * *